US010521386B2

(12) United States Patent
Kadgi et al.

(10) Patent No.: US 10,521,386 B2
(45) Date of Patent: Dec. 31, 2019

(54) USB-C MULTIPLE CONNECTOR SUPPORT FOR HOST AND DEVICE MODE CONFIGURATIONS

(71) Applicant: Intel Corporation, Santa Clara, CA (US)

(72) Inventors: Vijaykumar B. Kadgi, Portland, OR (US); Tin-Cheung Kung, Folsom, CA (US); Nivedita Aggarwal, Portland, OR (US); Chia-Hung Kuo, Folsom, CA (US); Prashant Sethi, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/109,994

(22) Filed: Aug. 23, 2018

(65) Prior Publication Data

US 2019/0065423 A1 Feb. 28, 2019

Related U.S. Application Data

(63) Continuation of application No. 15/278,128, filed on Sep. 28, 2016, now Pat. No. 10,078,608.
(Continued)

(51) Int. Cl.
*G06F 13/38* (2006.01)
*G06F 11/30* (2006.01)
(Continued)

(52) U.S. Cl.
CPC .......... *G06F 13/385* (2013.01); *G06F 1/1632* (2013.01); *G06F 1/263* (2013.01);
(Continued)

(58) Field of Classification Search
CPC .......... G06F 13/12; G06F 13/14; G06F 13/20; G06F 13/3051; G06F 13/36; G06F 13/38;
(Continued)

(56) References Cited

U.S. PATENT DOCUMENTS 10,078,608 B2   9/2018  Kadgi et al.
2011/0231539 A1  9/2011  Bhesania et al.
(Continued)

FOREIGN PATENT DOCUMENTS

CN   109643294 A    4/2019
DE   112017004663 T5  6/2019
(Continued)

OTHER PUBLICATIONS

"U.S. Appl. No. 15/278,128, Examiner Interview Summary dated Apr. 3, 2018", 3 pgs.
(Continued)

*Primary Examiner* — Thomas J. Cleary
(74) *Attorney, Agent, or Firm* — Schwegman Lundberg & Woessner, P.A.

(57) ABSTRACT

Various techniques for enabling the control and monitoring of a USB device mode controller to a USB-C connector, for the performance of a USB device mode data connection, are disclosed herein. In an example, a computing system that includes multiple USB-C connectors but a single USB device mode controller may manage the availability of the controller to a particular connector. The computing system may determine availability of a USB device mode controller to control the first USB-C connector, wherein the attempted data connection occurs with the first USB-C connector configured as an upstream facing port. The computing system may further perform, in response, a data role swap of the first USB-C connector to configure the first USB-C connector as a downstream facing port. The computing
(Continued)

system may, further continue the attempted data connection with the remote computing system via the first USB-C connector configured as a downstream facing port.

21 Claims, 15 Drawing Sheets

Related U.S. Application Data

(60) Provisional application No. 62/395,884, filed on Sep. 16, 2016.

(51) Int. Cl.
  *G06F 13/20* (2006.01)
  *G06F 9/4401* (2018.01)
  *G06F 1/16* (2006.01)
  *G06F 1/26* (2006.01)

(52) U.S. Cl.
  CPC .......... *G06F 1/266* (2013.01); *G06F 9/4411* (2013.01); *G06F 11/3051* (2013.01); *G06F 13/20* (2013.01); *G06F 2213/0042* (2013.01)

(58) Field of Classification Search
  CPC ........ G06F 13/385; G06F 13/40; G06F 13/13; G06F 13/4004; G06F 13/4022; G06F 13/4063; G06F 13/4068; G06F 13/4221; G06F 13/423; G06F 13/4265; G06F 13/4278; G06F 13/4295; G06F 9/4411; G06F 9/4413
  See application file for complete search history.

(56) References Cited

U.S. PATENT DOCUMENTS

| | | |
|---|---|---|
| 2015/0331826 A1 | 11/2015 | Ghosh et al. |
| 2016/0179648 A1 | 6/2016 | Srivastava et al. |
| 2016/0277235 A1* | 9/2016 | Bhesania ............ H04L 41/0803 |
| 2017/0351502 A1 | 12/2017 | Aggarwal et al. |
| 2018/0081843 A1 | 3/2018 | Kadgi et al. |

FOREIGN PATENT DOCUMENTS

| | | |
|---|---|---|
| WO | WO-2015002648 A1 | 1/2015 |
| WO | WO-2016097689 A1 | 6/2016 |
| WO | WO-2016105621 A1 | 6/2016 |
| WO | WO-2018052573 A1 | 3/2018 |

OTHER PUBLICATIONS

"U.S. Appl. No. 15/278,128, Non Final Office Action dated Jan. 9, 2018", 17 pgs.
"U.S. Appl. No. 15/278,128, Notice of Allowance dated May 16, 2018", 5 pgs.
"U.S. Appl. No. 15/278,128, Response filed Apr. 6, 2018 to Non Final Office Action dated Jan. 9, 2018", 13 pgs.
"BIOS Implementation of UCSI—Technical White Paper", Revision 001, (Feb. 2016), 1-14.
"International Application Serial No. PCT/US2017/045746, International Search Report dated Nov. 15, 2017", 3 pgs.
"International Application Serial No. PCT/US2017/045746, Written Opinion dated Nov. 15, 2017", 6 pgs.
"USB Type-C Connector System Software Interface (UCS!)", Revision 1.0, (Sep. 29, 2016), 1-47.
Hewlett-Packard Corporation, et al., "Advanced Configuration and Power Interface Specification", (Dec. 6, 2011).
"International Application Serial No. PCT/US2017/045746, International Preliminary Report on Patentability dated Mar. 28, 2019", 8 pgs.

* cited by examiner

USB-C MULTIPLE CONNECTOR SUPPORT FOR HOST AND DEVICE MODE CONFIGURATIONS

PRIORITY CLAIM

This application is a continuation of U.S. application Ser. No. 15/278,128, filed Sep. 28, 2018, which claims the priority benefit of U.S. Provisional Application Ser. No. 62/395,884, filed Sep. 16, 2016, all of which are hereby incorporated by reference in their entirety.

TECHNICAL FIELD

Embodiments described herein generally relate to communication bus management and configurations in a computing system, and, for some examples, the management and configuration of communication bus controller operations for a computing system that includes Universal Serial Bus Type-C (USB-C) connection ports.

BACKGROUND

The use of the Universal Serial Bus Type-C (USB-C) specification for device connections is becoming increasingly popular for computing devices and peripherals. The USB-C specification offers a standardized connection port and interchangeable cable ends for use by both hosts and devices, with such ports and cables being able to provide power and data connections. The USB-C specification offers improvements over prior USB specifications, with increased transmission of power and data rates available via USB-C.

Some existing devices that provide USB-C support only include a single USB-C connector (such as computing devices and smartphones that include a single USB-C receptacle as the exclusive external connector for power and wired connectivity). As the use of the USB-C specification increases in popularity, devices are being designed to include multiple USB-C ports directly within the device form factor, to more easily facilitate the connection of multiple external devices and power inputs via multiple USB-C cables.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
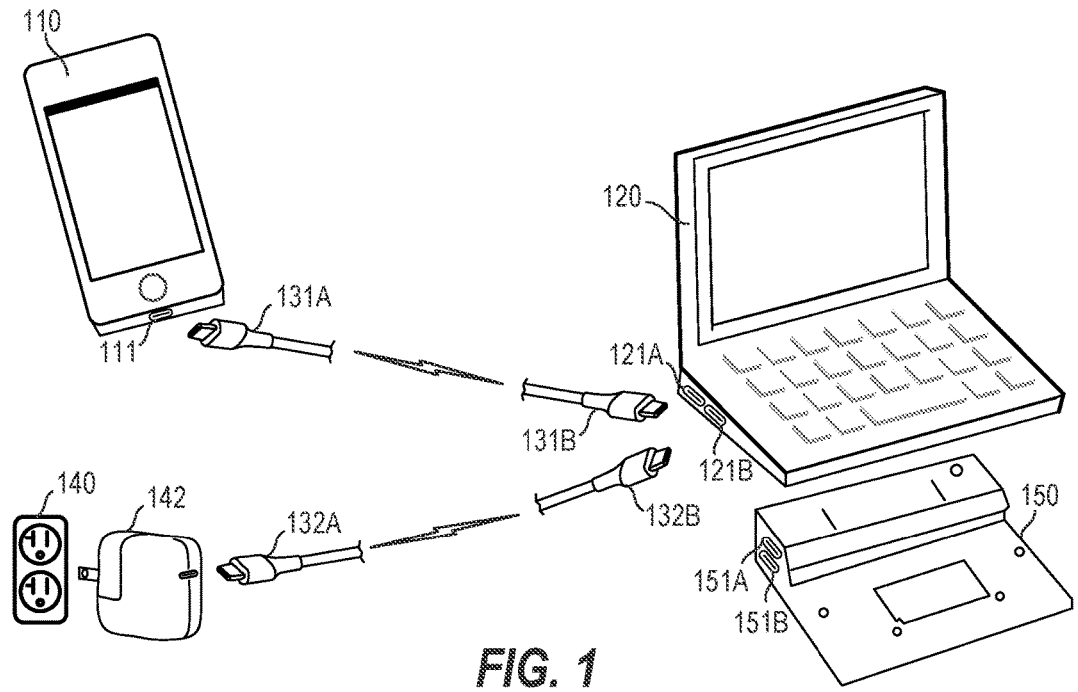
FIG. 1 illustrates an overview of an operational environment including a mobile computing device and power adapter used for USB-C connections with a computing system, according to an example.

In the following description, methods, configurations, device components, and related apparatuses are disclosed for the operation of a USB controller operating in host and device modes, for use with USB-C connectors and interfaces. Specifically, the following includes examples of techniques and device configurations to perform an evaluation of a status of a USB Device Mode controller, to determine a mapping and characteristic of a USB-C connector to a USB Device Mode controller if the USB Device Mode controller is present, and to handle a condition where the USB Device Mode controller is unavailable or is not present. These techniques allow an operating system to interact with platform firmware through an Advanced Configuration and Power Interface (ACPI)-specification interface, and perform an appropriate action within the system for the USB Device Mode controller or USB-C connector based on the outcome of the interaction.

USB employs a master/slave architecture, where a "host" acts as the master for a bus, and a connected USB "device" acts as a slave on the bus (acting under the control of the host). In many settings, however, an electronic system (such as a tablet, a smartphone, a personal computer, etc.) may operate in either mode, as either as a master "host" or as a slave "device". As discussed herein, the term "USB Host Mode" refers to a scenario where the particular system operates as a host or link master, and may control connected peripheral devices; and the term "USB Device Mode" refers to a scenario where the particular system operates as a device or link slave, and may act as a peripheral device under control of the host.

Although many systems currently deploy a single USB-C connector, it is expected that multiple USB-C connectors will be increasingly deployed in systems such as a tablets, laptops, 2-in-1s, and desktop systems, with such systems intended to be dual role-capable (as host and device, separately or in combination). In order to establish a working USB data connection between two dual role-capable systems, a USB host controller of a first computing system connects to a USB device controller of a second computing system. However, to save cost, a system integrator may design a particular computing system to include only one single USB Device Mode controller for the entire computing system (instead of one USB Device Mode controller deployed per USB-C connector). This type of a hardware configuration—one USB Device Mode Controller with multiple USB-C connectors—presents a technical restriction for a system software to determine the mapping between the respective USB-C connectors and the single USB Device Mode controller, since the USB Device Mode controller is able to manage only one connector at a time.

With the techniques discussed herein, system software may maintain and access information on the status of the USB Device Mode controller, so that mapping of the device mode is managed correctly and related information is communicated within the system software. For example, if the USB Device Mode controller is already mapped to one of the USB-C connectors (i.e. two dual-role capable systems are already connected as a Host/Device pair), the system software may provide an appropriate message if the user tries and fails to connect another host system to the other connector on the system that has its device mode controller already in use. This information enhances the end user experience by allowing users to take action and avoid a silent failure scenario.

With the techniques discussed herein, a computer system may also determine whether a USB Device Mode controller/USB-C connector mapping exists, and may respond with appropriate logic and notifications if a second USB-C connector is attempted to be used for a USB device mode data connection. An example of a notification message might include content such as: "A USB data connection already exists on the connector on Port 1 (the left of the machine). Please unplug the USB cable to allow a new connection to be established." Existing operating systems and programs do not include these or other described management and tracking capabilities, leading to incomplete notifications, error conditions, and inoperable hardware states.

FIG. 1 illustrates an overview of an operational environment including a mobile computing device 110 and power adapter 142 used for USB-C connections with a computing system 120, according to an example. It will be understood that additional components, devices, or circuitry not depicted in FIG. 1 may be used to implement the following configuration and techniques (including internal circuitry and software features not visible in the environment of FIG. 1).

The computing system 120 is depicted as including multiple USB-C ports 121A and 121B, each port including a female USB-C connector to receive a male USB-C connector, such as the male connectors 131B, 132B provided by respective USB-C cables. On the opposite end of the respective USB-C cables, the cables may be connected to either a host, a device, or a power source, such as the male connector 131A adapted to couple to the USB-C port 111 of the mobile computing device 110 (operable as either host or device); and the male connector 132A adapted to couple to a power adapter 142. The power adapter 142 in turn may connect to a power source 140 such as an electrical outlet.

The computing system 120 may include an internal USB device mode controller and USB host mode controller that may be assigned to either of the ports 121A, 121B. Because the same form factor of a USB-C connector allows connection with a host, device, or a power source, there are many scenarios where the same port will be used either as a host or as a device. Thus, if only one USB device mode controller exists on the system, the controller needs to be switched from controlling a first connector to controlling a second connector in order to fully operate the computing system in device mode.

The computing system 120 may be coupled with a dock 150 to provide port replication or additional ports, such as USB-C connectors 151A, 151B. The dock 150 may be provided in the form factor of a docking station that offers charging capability in addition to USB-C connectors and other types of connectors (such as DisplayPort, or Thunder-Bolt ports). Additionally, the computing system 120 may include a power delivery controller (not shown) that manages the per-connector capability of the respective USB-C ports, and a device policy manager (not shown) that operates as a central agent to coordinate limited resources across multiple USB-C connectors.

Figure 2:
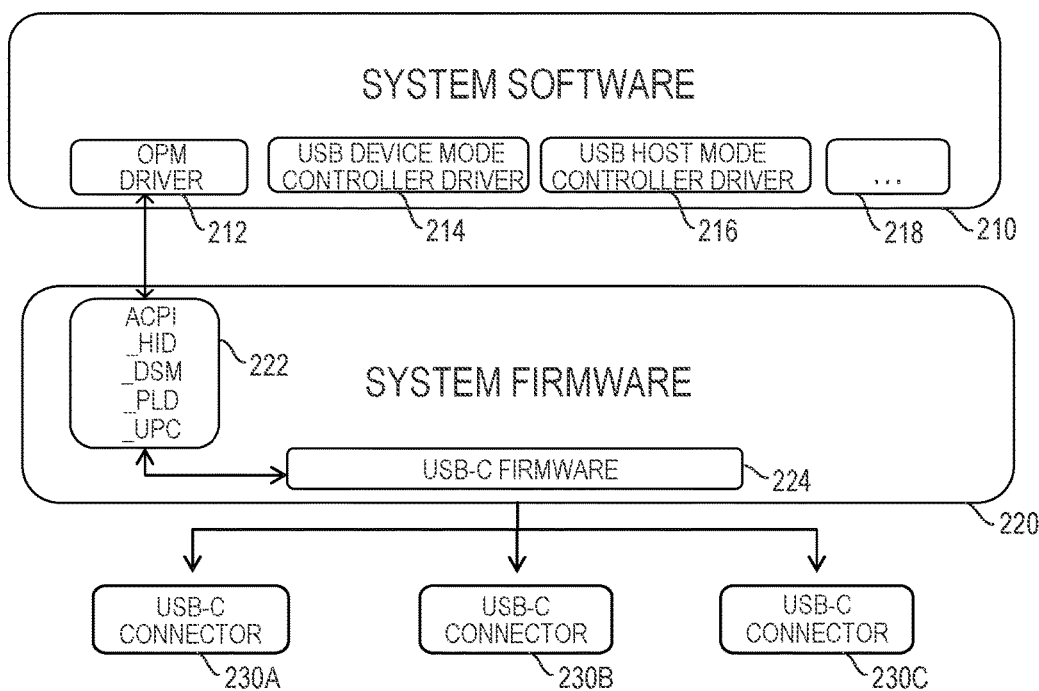
FIG. 2 illustrates a block diagram of a computing system architecture configured for implementation of USB host and device controller management, according to an example.

FIG. 2 illustrates a block diagram of a computing system architecture configured for implementation of USB-C host and device controller management with the techniques described herein. The architecture is depicted as including a system firmware layer 220 with platform information that the system software layer 210, such as with use of an Operating System Policy Manager (OPM) driver 212, may communicate with or query when required.

As shown, the architecture includes an operation of system software layer 210 that integrates with operations performed in the system firmware layer 220, for control of the respective USB-C connectors 230A, 230B, 230C. The system software layer 210 is depicted as including an OPM driver 212, a USB Device Mode Controller Driver 214, a USB Host Mode Controller Driver 216, and other components 218 (e.g., other drivers). The system firmware layer 220 is depicted as including USB-C firmware 224, and ACPI objects 222 (e.g., HID (Hardware ID), _DSM (Device Specific Method), _PLD (Physical Device Location), _UPC (USB Port Capabilities) functions). The role of these components is discussed in the following paragraphs.

The USB Host Mode Controller Driver 216 operates as an Operating System level driver component. The responsibility of the USB Host Mode Controller Driver 216 is to numerate and manage host controller hardware to enable successful connection between a USB Host Controller and a USB device. Thus, when there is a successful USB data connection, host and device controller systems may interact through an Operating System specific mechanism.

The USB Device Mode Controller Driver 214 also operates as an Operating System level driver component. The responsibility of the USB Device Mode Controller Driver 214 is to discover, numerate, and manage USB Function Mode controller hardware operation to enable a USB Device Mode Controller to be successfully connected to USB Host Mode Controller as a USB device. When there is a successful USB data connection, host and device controller systems are able to interact through an Operating System specific mechanism.

The OPM driver 212 operates as an Operating System level driver component. The responsibility of the OPM driver 212 is to query and analyze the status of the USB-C connectors (e.g., connectors 230A, 230B, 230C) and the connection (host vs device connections) corresponding to each of the USB-C connectors on the system. The OPM driver 212 also may report appropriate messages or errors to the end user. In some examples, the OPM driver 212 is also responsible for performing a dynamic role swap between device mode and host mode. In other examples, the functionality of the OPM driver 212 may be performed by other components of the system software layer 210 such as the USB Host Mode Controller Driver 216 or the USB Device Mode Controller Driver 214.

The ACPI objects 222 are provided in the system firmware layer 220 (e.g., implemented with BIOS or UEFI firmware) and serve as a communication channel between the software and platform firmware/hardware. The ACPI objects 222 implement functionality such as querying the status of the USB-C connectors (e.g., connectors 230A, 230B, 230C), reporting specific information, and also passing commands to execute to the USB-C firmware 224.

The USB-C firmware 224 includes firmware that controls and communicates with the terminal USB-C connector (e.g., connectors 230A, 230B, 230C) and the corresponding connected device. In a client system, the USB-C firmware 224 may be implemented as embedded controller firmware, PD controller firmware, or a Battery management (I2C- or SPB-based) driver component.

The USB Host Mode Controller and Device Mode Controller may also support a power management mechanism to enable the controllers to be completely powered off and appear to be unplugged from the platform. In this scenario, a corresponding driver stack and associated ACPI objects (e.g., existing designs of ACPI objects) may be removed from the Operating System. The techniques discussed herein support computer systems with such power management mechanisms by implementing connector-related ACPI objects under the ACPI device scope of OPM driver 212, instead of under a scope of the USB Host Mode Controller or Device Mode Controller. Examples may include _PLD, _UPC, and any other objects used to describe connector attributes of ACPI objects 222. In this example, connector-related information is defined as global with respect to the platform, and may be returned to the USB Host and Device driver stack when this information is queried.

Example pseudo code to implement the operations under the ACPI device scope of the OPM driver are demonstrated with the following:

OPM ACPI Device Namespace:
Device (CR01) { // Connector 1

-continued

```
    Method (_PLD) {description of Connector 1)
    Method (_UPC) {description of Connector 1)
}
USB ACPI Namespace:
Device(HS05) { // High Speed port connected to connector 1
    Method (_PLD) {Return (\SB.CR01._PLD)}
    Method (_UPC) {Return (\SB.CR01._UPC)}
}
```

Figure 3:
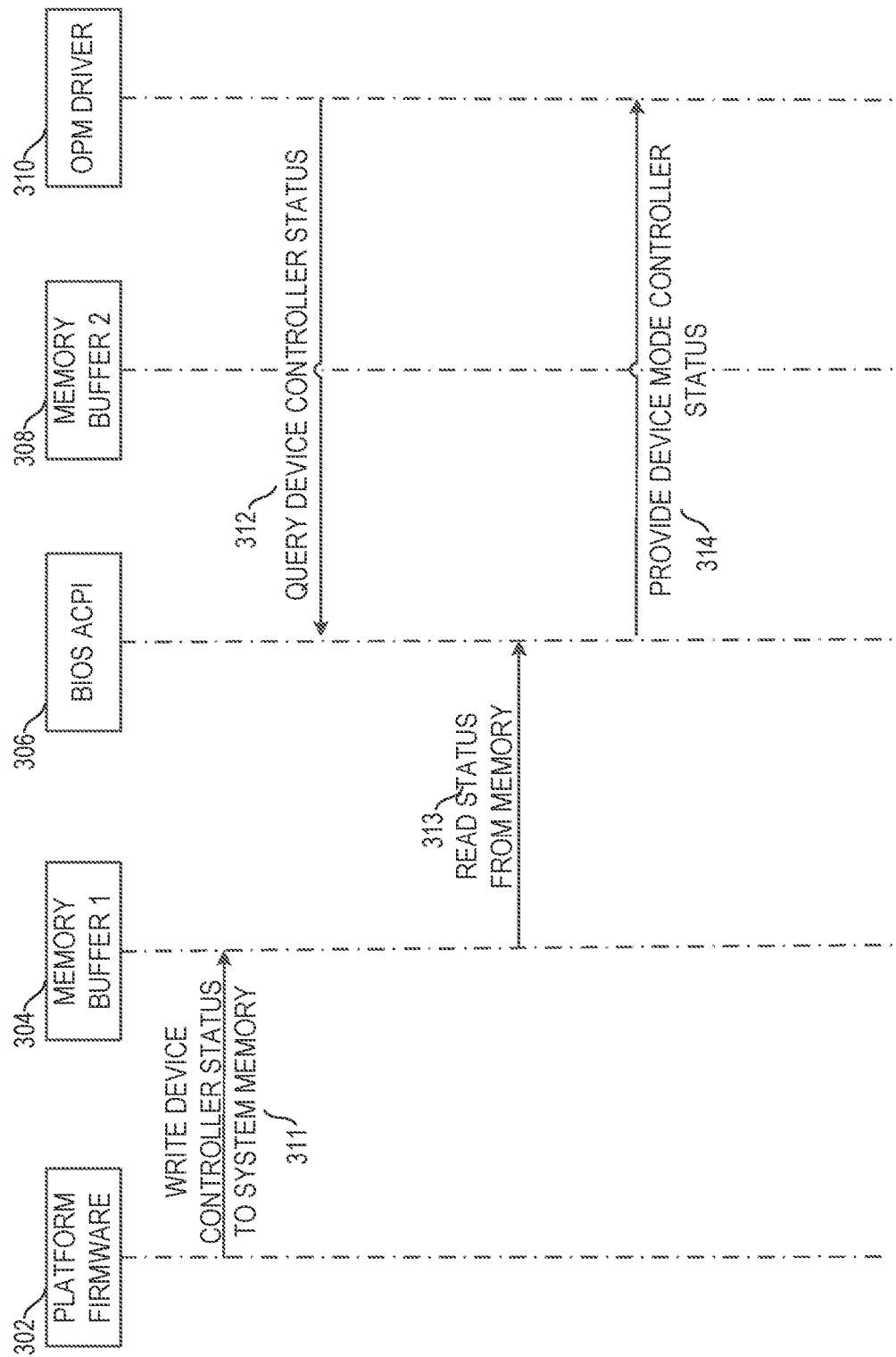
FIG. 3 illustrates a sequence diagram depicting a technique to determine a status of a USB Device Mode controller, according to an example.

FIG. 3 illustrates a sequence diagram depicting a technique to determine a status of a USB Device Mode controller, according to an example. The sequence diagram of FIG. 3 specifically illustrates a scenario of operations to determine and record whether a USB Device Mode controller is present. This information may be used by subsequent operations to reassign roles and controller assignments for respective USB-C connectors (provided that the USB Device Mode controller is present in the computing system).

Upon system boot and system level (Sx) state resume, Platform Firmware 302 will dynamically write a USB Device Mode controller status in a system memory location accessible by BIOS or UEFI firmware ASL code (operation 311), such as to a Memory Buffer 1 304. Later, the system software (e.g., operating an OPM Driver 310) may query the USB Device Mode controller status (operation 312), such as during a Do Entry driver routine. With this query from the OPM Driver 310 to the ACPI methods 306 (e.g., hosted by the BIOS or UEFI firmware), the ACPI methods operate to read the Memory Buffer 1 304 including the USB Device Mode controller status (operation 313). In turn, the USB Device Mode controller status is provided from the ACPI methods 306 to the OPM Driver 310 (operation 314).

Figure 4:
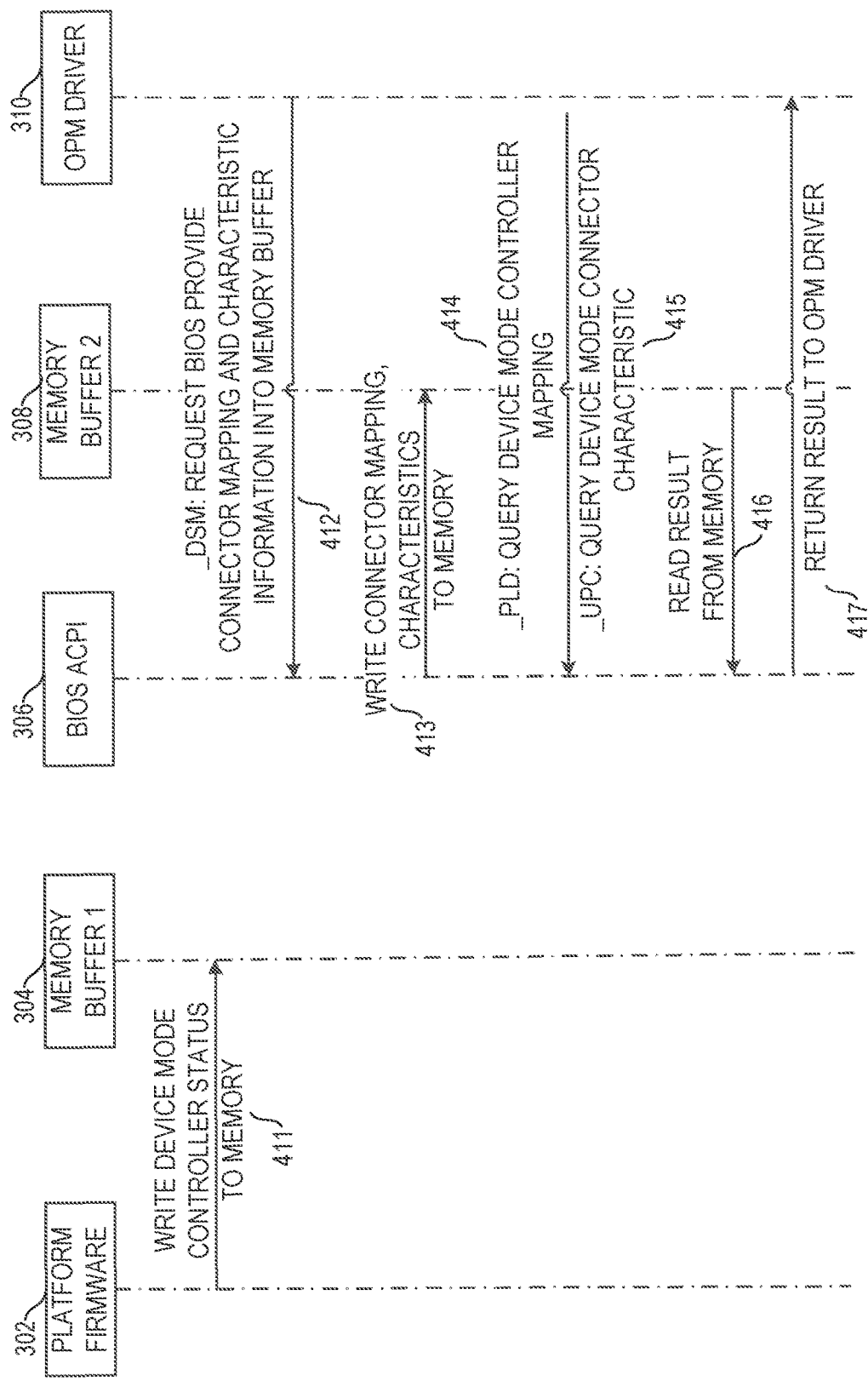
FIG. 4 illustrates a sequence diagram depicting a technique to determine a port mapping and connector characteristics for a USB Device Mode controller, according to an example.

FIG. 4 illustrates a sequence diagram depicting a technique to determine a port mapping and connector characteristic of a USB Device Mode controller according to an example. The sequence diagram of FIG. 4 specifically illustrates a scenario of operations for system software to determine the mapping and characteristic of a particular USB-C connector to the USB Device Mode controller, if present in the computing system.

As shown, the state of the device controller status is written in the system memory location (operation 411), such as may be performed with the techniques of FIG. 3. If a USB Device Mode controller is present, the Platform Firmware 302 (EC/I2C/PCIe etc.) will interact with MUX logic to determine the mapping and connector characteristic (USB2/USB3 etc.) of a USB Device Mode controller (operation 412). This operation may be implemented with a call to the ACPI methods 306, with the execution of BIOS or UEFI firmware code (such as ASL (ACPI Source Language) code executed as part of a _DSM ACPI method). The mapping and characteristic information is then saved to the system memory (e.g., Memory Buffer 2 308) accessible by the Platform Firmware 302 (operation 413).

For example, when system software (e.g., system software operating the OPM Driver 310) calls an ASL routine to request the mapping and characteristic information, the ASL accesses system memory (Memory Buffer 2 308) to obtain the information, and, in some examples, updates the information dynamically. For example, the read operation may be performed through a _PLD method to query the USB Device Mode controller mapping (operation 414) and a _UPC method to query the connector characteristics that are assigned to the USB Device Mode controller (operation 415). After reading the result from system memory (operation 416) (or determining an update to the value in system memory), the updated result will return to the operating system (e.g., via the OPM Driver 310) as the ASL call is completed (operation 417). (For example, the connector characteristics may be used by the operating system to determine whether certain functions or capabilities are available on the particular USB-C connector).

Figure 5:
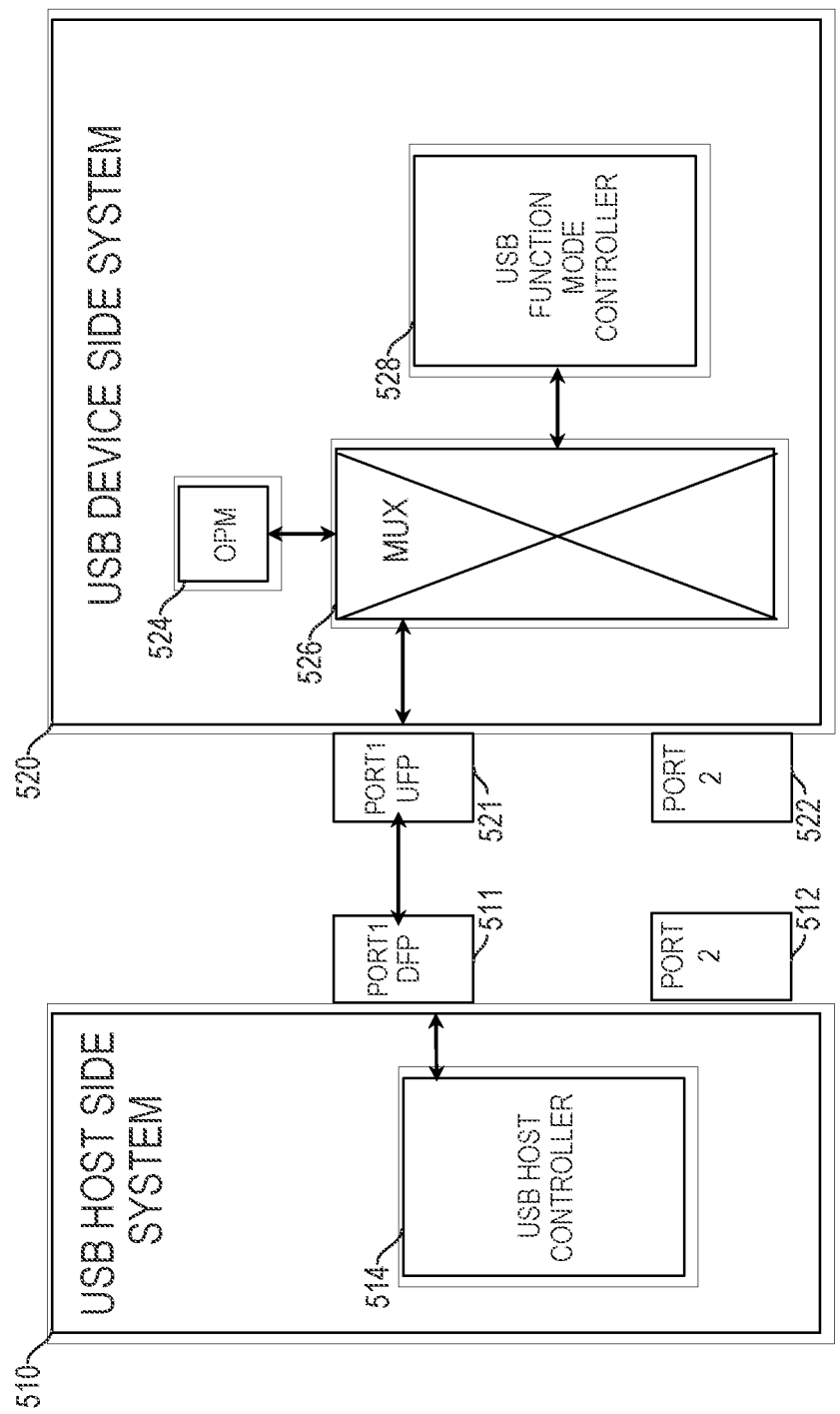
FIG. 5 illustrates a block diagram of computing systems adapted for communications through the use of dynamic port mapping with a USB function mode controller, according to an example.

FIG. 5 illustrates a block diagram of example computing systems adapted for communications through the use of dynamic port mapping with a USB function mode controller. As shown, a USB host side system 510 includes a USB Host Controller 514, which provides a first port 511 and a second port 512, with the first port 511 configured as a downstream facing port (DFP) (e.g., a port operated in a host mode). As also shown, the USB device side system 520 includes a first port 521 and a second port 522, with the first port 521 configured as an upstream facing port (UFP) (e.g., a port operated in a device mode). As a result, communications may be exchanged between the USB host side system 510 and the USB device side system 520 via control of the USB Host Controller 514.

The dynamic port mapping performed on the USB device side system 520, to map the first port 521 to a USB Device Mode controller (not shown), is implemented through the use of an Operating System Policy Manager (OPM) 524 and a Multiplexer 526, such as by implementing the sequence of operations from FIG. 4. The MUX mapping assignment and characteristics of the assigned USB-C port (such as whether the port supports USB 2.0 or USB 3.0/SuperSpeed) are reported to the system firmware. The system firmware then may dynamically provide information to the USB Function Mode Controller 528 via ACPI methods 306, such as the _PLD and _UPC method.

Example pseudo code to implement the operations are provided in the following:

```
//
// definition:
// 0x01: Connected to Port1
// 0x02: Connected to Port2
//
Name(PLD1, Package( ) { Buffer(0x10) {
0x01, 0xC6, 0x72, 0x00, 0x00, 0x00, 0x00, 0x69,
0x0C, 0x80, 0xXX, 0x00, 0x00, 0x00, 0x00}})
//
// definition:
// 0x08: USB-C USB2 only
// 0x09: USB-C USB2 and SS
//
Name(UPC5, Package( ) { 0xFF, 0xXX, 0x00, 0x00 })
Scope (\_SB.PCI0)
{
    Device (XDCI)   // Device Controller
    {
        Method (_PLD, 0, Serialized)
        {
            Return (PLD1)
        }
        Method (_UPC, 0, Serialized)
        {
            Return (UPC5)
        }
    }
}
```

Figure 6:
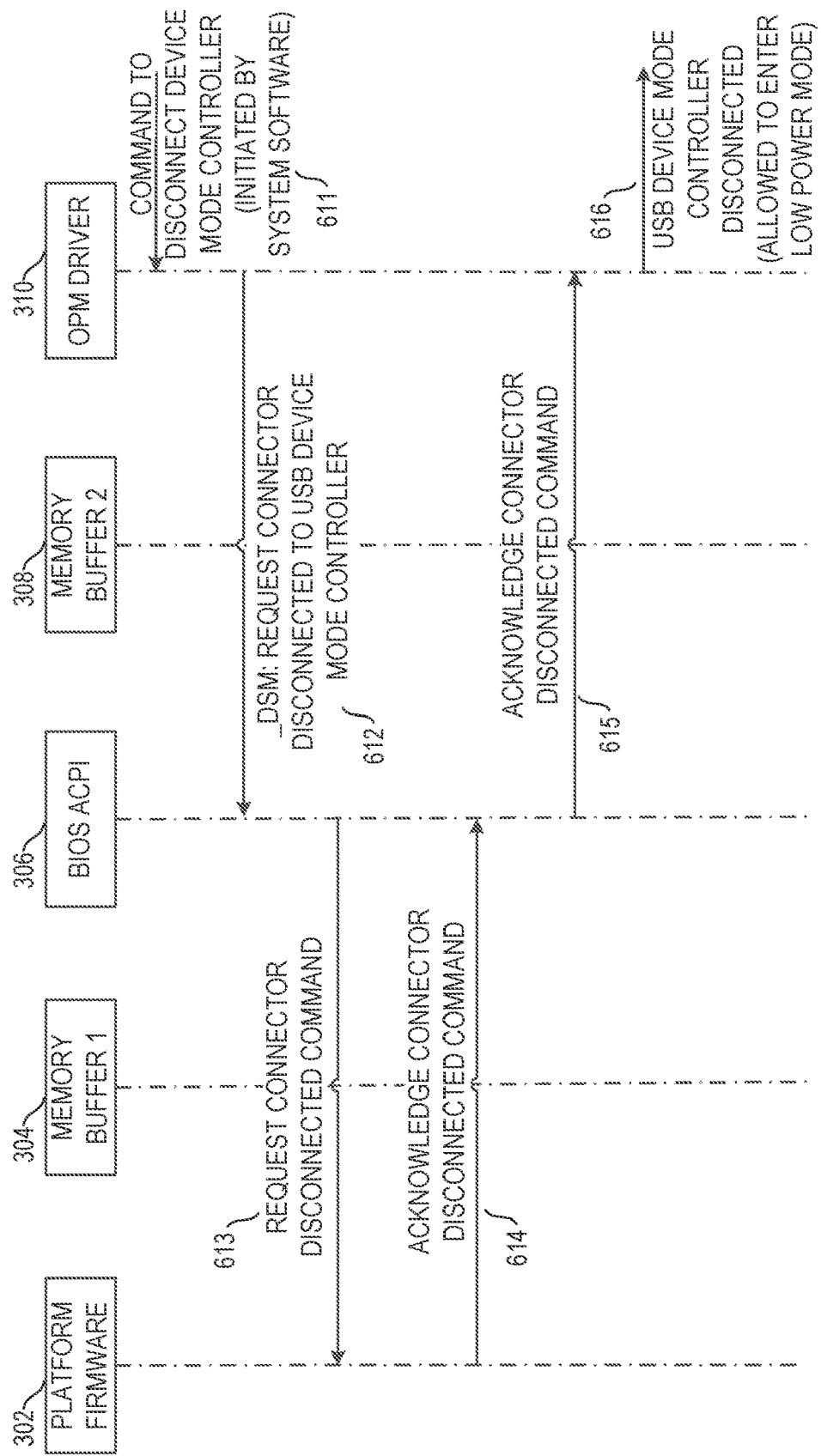
FIG. 6 illustrates a sequence diagram depicting a technique to disconnect a USB Device Mode controller, according to an example.

FIG. 6 illustrates a sequence diagram depicting an example technique to disconnect a USB Device Mode controller. Specifically, FIG. 6 illustrates the processing operations being performed in response to a command to disconnect the USB Device Mode controller (operation 611), such as may be initiated by system software.

For example, after connector mapping and characteristic information is reported to system software (e.g., system software operating the OPM Driver 310), the system software has the option to interact with platform firmware (EC/I2C/PCIe, and the like) to control the MUX logic to disconnect or re-map the USB Device Mode controller to a different connector, based on a system policy or user inputs. An example of a system policy includes the use of system software to disconnect a USB Device Mode controller from a connector after a pre-defined idle timeout. An example of a user inputs is the scenario in which user attempts to connect a second USB host system to another connector and then requests a USB Device Mode controller to be re-mapped to specified connector. In an example, the mechanism to remap a connector involves operations to disconnect the connector, followed by re-assigning the connector using MUX'ing logic through Platform Firmware 302.

As shown, a _DSM method call is provided from the OPM Driver 310 to the ACPI methods 306 to request a particular connector be disconnected from the USB Device Mode controller (operation 612). The ACPI methods 306 in turn communicate a connector disconnected command to the Platform Firmware 302 (operation 613). The Platform Firmware 302 acknowledges the connector disconnected command to the ACPI methods 306 (operation 614) and the ACPI methods 306 acknowledge the connector disconnected command to the OPM Driver 310 (operation 615). Thereafter, the USB Device Mode controller is disconnected from the particular USB-C connector (operation 616) and is allowed to enter a low power mode.

Figure 7:
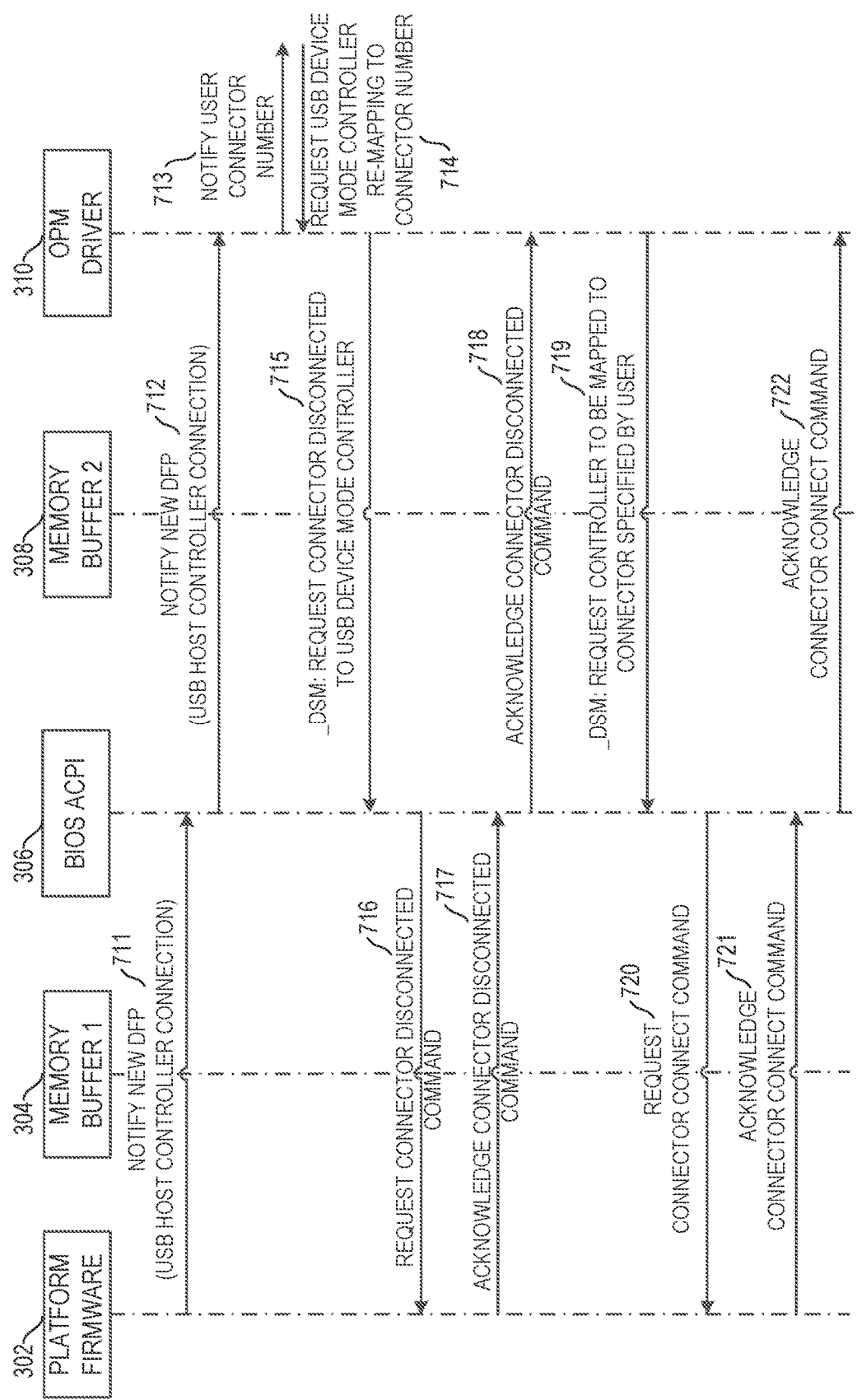
FIG. 7 illustrates a sequence diagram depicting a technique to re-assign a connector mapping for a USB Device Mode controller, according to an example.

FIG. 7 illustrates a sequence diagram depicting an example technique to re-assign a connector mapping for a USB Device Mode controller. Specifically, FIG. 7 illustrates the processing for remapping a controller to a particular USB-C connector, such as may be initiated by a request or command received in system software from a user.

As shown, the Platform Firmware 302 operates to notify the ACPI methods 306 of a new downfacing port (operation 711), such as established with a USB host controller connection. In turn, the ACPI methods 306 notify the OPM Driver 310 of the new downfacing port (operation 712). The OPM Driver 310 operates to provide a notification, to the system software, of the connector that has been configured as a downfacing port (operation 713).

In response to this notification, the system software may receive a user input or implement a system policy that requests a new remapping of the USB Device Mode controller to a second USB-C connector (operation 714). In response, the OPM Driver 310 operates to call a _DSM function to request that the first USB-C connector is disconnected from the USB Device Mode controller (operation 715).

The ACPI methods 306 provide a command to the Platform Firmware 302 to request that the first USB-C connector is disconnected from the USB Device Mode controller (operation 716), and in response the Platform Firmware 302 will disconnect the first USB-C connector and acknowledge the command (operation 717) to the ACPI methods 306. The ACPI methods 306 in turn provide an acknowledgment of the disconnection of the first USB-C connector (operation 718) to the OPM Driver 310. In response to success of the commands, the USB Device Mode controller is not mapped to a USB-C connector.

The OPM Driver 310 then proceeds to request that the second USB-C connector (operation 719), which may be a connector specified by the user (or by the system software), is mapped to the USB Device Mode controller. This request may be provided to the ACPI methods 306 with a _DSM function. In turn, the ACPI methods 306 provide a request to the Platform Firmware 302 for a connector connect command (operation 720), and in response the Platform Firmware 302 will connect the second USB-C connector to the USB Device Mode controller and acknowledge the command (operation 721) to the ACPI methods 306. The ACPI methods 306 in turn provide an acknowledgement of the connection of the second USB-C connector (operation 722).

Further operations may be performed by the system software to handle the condition where a USB Device Mode controller is not present or is unavailable for use. Because the initial role assignment to a dual role connector is un-deterministic, it is possible that a USB-C connector is assigned as an upstream facing port at boot time. To depict this scenario, FIG. 8 illustrates a block diagram of communications attempted between a downstream facing port of a first computing system 810 including a USB Device Mode Controller 814 and an upstream facing port of a second computing system 820 without a device mode controller, according to an example configuration.

Figure 8:
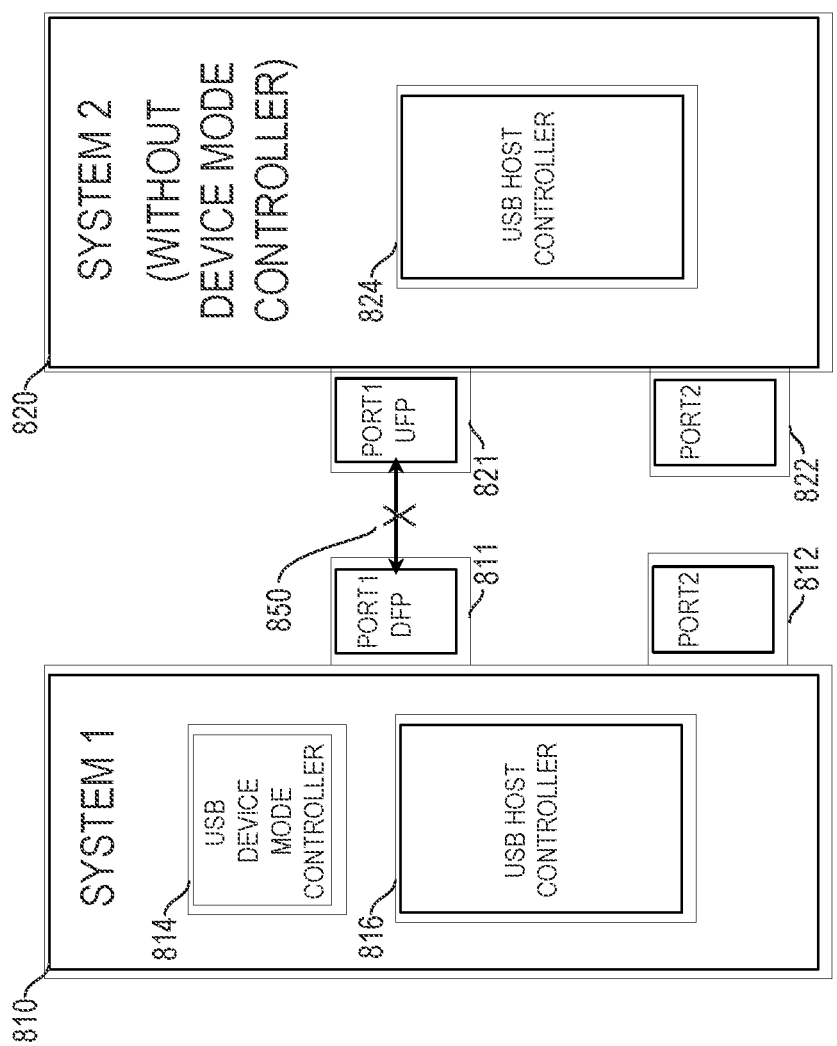
FIG. 8 illustrates a block diagram of communications attempted between a downstream facing port of a first computing system including a USB Device Mode controller and an upstream facing port of a second computing system without a USB Device Mode controller, according to an example.

In FIG. 8, the first computing system 810 includes a plurality of USB-C ports including Port1 811, configured as a downstream facing port, and Port2 812. The second computing system 820 also includes a plurality of USB-C ports including Port1 821 configured as an upstream facing port, and Port2 822. The first computing system 810 includes the USB Device Mode Controller 814 in addition to a USB Host Controller 816 (to support operation in either device or host modes); whereas the second computing system 820 only includes a USB Host Controller 824 without any device mode controller.

If the USB-C connector is configured as an upstream facing port and there is no USB Device Mode controller present on the second computing system 820, then there is no possibility to establish USB communication to the first computing system as an upstream facing port (shown with failed connection 850). In this case, the system software may initiate a data role swap at the initial connection time to attempt to establish a USB data connection with reversed roles.

Figure 9:
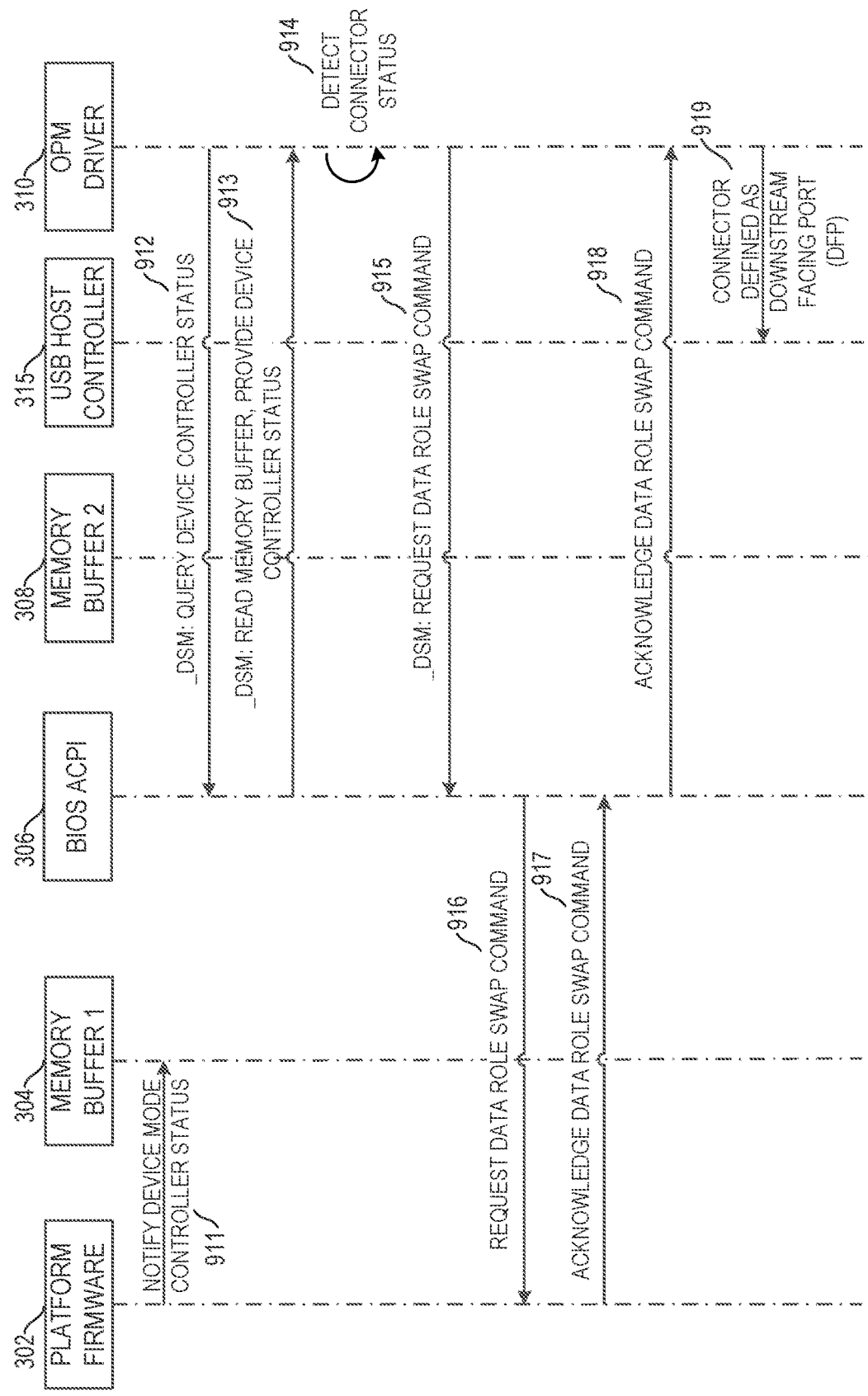
FIG. 9 illustrates a sequence diagram depicting a technique to request a role swap for a computing system without a USB Device Mode controller, according to an example.

FIG. 9 illustrates a sequence diagram depicting an example technique to request a role swap for a computing system without a USB Device Mode controller. This sequence includes an internal notification of the lack of a USB Device Mode controller from the Platform Firmware 302 (operation 911), obtained from a value stored into a system memory location (such as Memory Buffer 1 304). Operations of the computing system may include a DSM function query from the OPM Driver 310 to the ACPI methods 306 for querying the device controller status (operation 912). The DSM method reads the device controller status from the memory location (e.g., Memory Buffer 1 304), and returns the device controller status to the OPM Driver 310 (operation 913).

The OPM Driver 310 operates to detect the status of a particular USB connector (operation 914), such as in a scenario where the USB connector is configured as an upstream facing port. In response, due to the lack of a USB Device Mode controller, the OPM Driver 310 will initiate a data swap command. This may include the request of a data role swap command with a _DSM method (operation 915) to the ACPI methods 306, and the ACPI methods 306 will request a data role swap command to the Platform Firmware 302 (operation 916). In response, the Platform Firmware 302 will acknowledge the command to the swap the roles of the particular USB-C connector (operation 917) to the ACPI methods 306. The ACPI methods 306 in turn provide an acknowledgement of the role swap for the particular USB-C connector to the OPM Driver 310 (operation 918). The OPM Driver 310 may then notify the USB Host Controller 315 that the particular USB-C connector is defined as a downstream facing port (operation 919).

Figure 10:
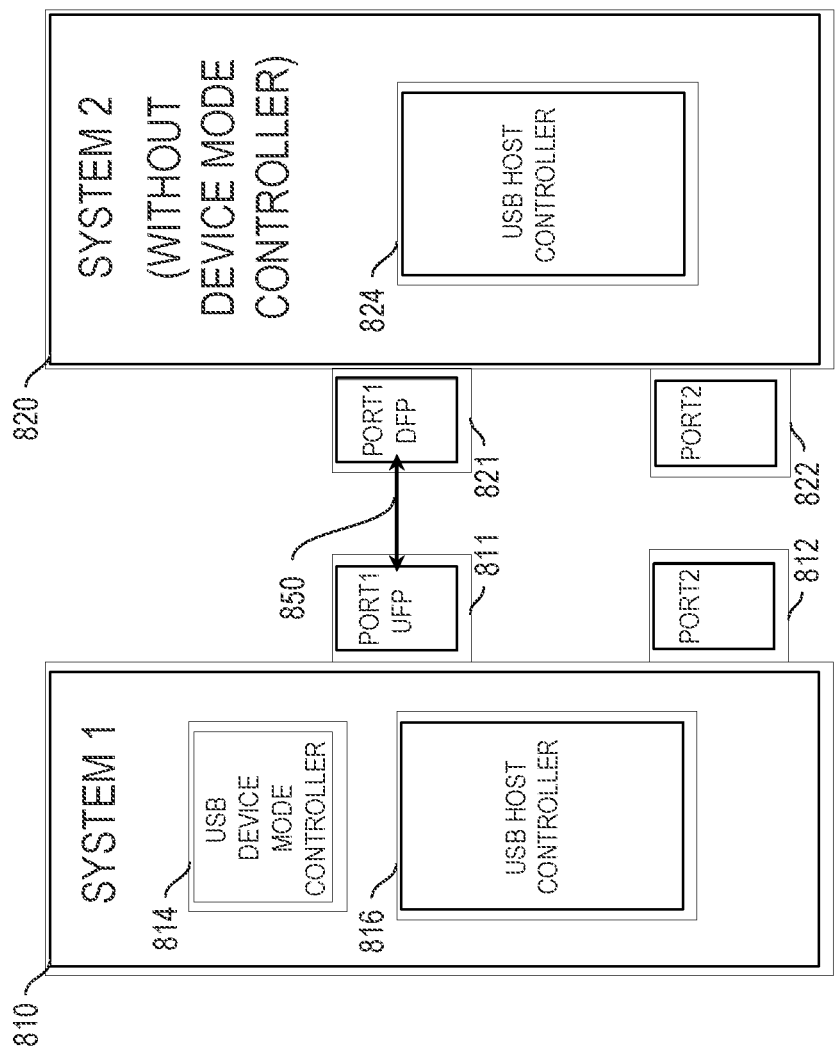
FIG. 10 illustrates a block diagram of communications attempted between a upstream facing port of a first computing system including a USB Device Mode controller and a downstream facing port of a second computing system without a USB Device Mode controller, according to an example.

FIG. 10 illustrates a block diagram of communications attempted between an upstream facing port of the first computing system 810 including the USB Device Mode Controller 814 and a downstream facing port of the second computing system 820 without a device mode controller, according to an example configuration. The components depicted in FIG. 10 are similar to FIG. 8, except that configuration of FIG. 10 shows the result of a port swap performed on both the first computing system 810 and the second computing system 820. Specifically, the system software of the second computing system 820 has initiated a data role swap at the initial connection time to attempt to establish a USB data connection with reversed roles.

If a device mode controller is present on the first computing system 810, then the USB data connection may be established successfully with the second computing system 820. The system software of the first computing system may perform a re-mapping technique (e.g., with the operations of FIG. 7) to ensure a correct mapping of Port1 811 to the USB Device Mode Controller 814. As a result of the role swap and mapping, the Port1 821 is configured as a downstream facing port, and the Port1 811 is configured as an upstream facing port.

Figure 11:
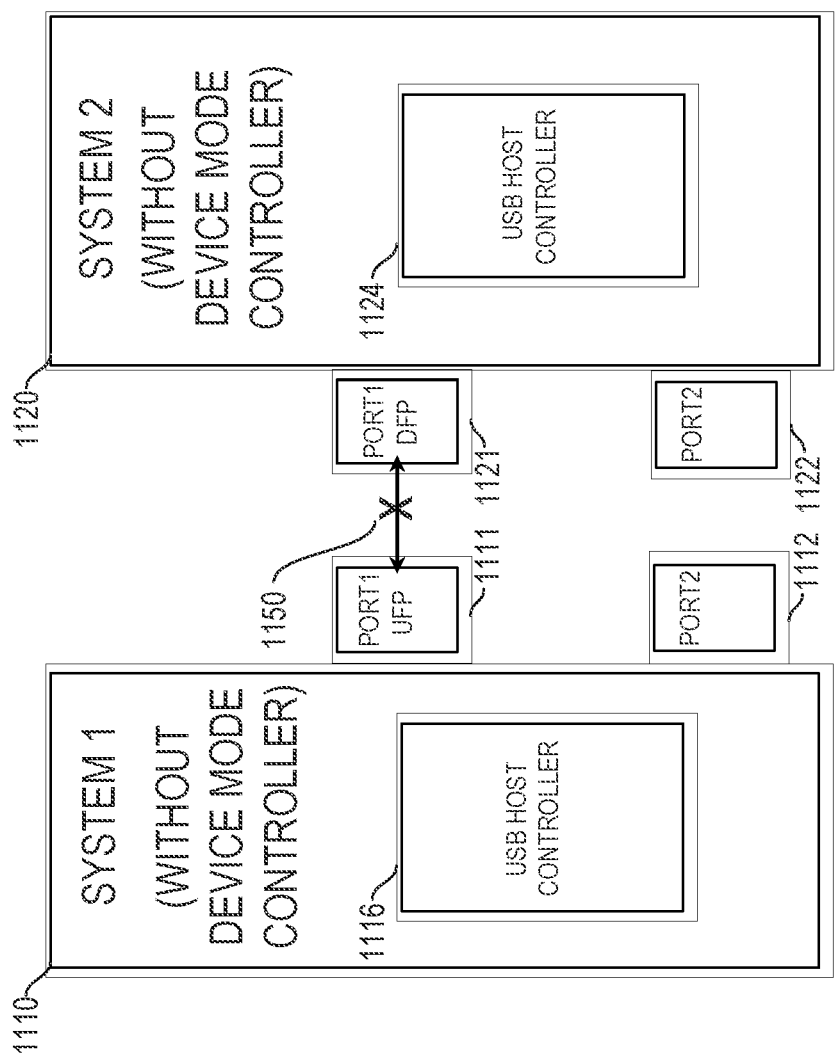
FIG. 11 illustrates a block diagram of communications attempted between a first computing system without a USB Device Mode controller and a second computing system without a USB Device Mode controller, according to an example.

FIG. 11 illustrates a block diagram of communications attempted between a first computing system 1110 without a USB Device Mode controller and a second computing system 1120 without a USB Device Mode controller, according to an example configuration. As shown, the first computing system 1110 includes a USB host controller 1116, and the second computing system 1120 includes a USB host controller 1124, allowing either system to serve as a host but not a device. As shown, the first computing system 1110 and the second computing system 1120 each include a plurality of USB-C connectors, including the first computing system 1110 including a first port 1111 in an upstream facing port configuration and a second port 1112, and the second computing system 1120 including a first port 1121 in a downstream facing port configuration and a second port 1122.

If a USB Device Mode controller is not present on either system (or the USB Device Mode controller cannot be assigned to the particular USB-C connector), then no USB data connection may be established between ports 1111 and 1121 (shown with failed connection 1150). System Software on the first computing system 1110 will have knowledge of a USB Device Mode controller not being present and is notified of any data role change. At this point, the System Software (e.g., an OPM Driver) on the first computing system may provide an appropriate message to user. The example of this message could be "No USB data connection is possible for the systems connected using a USB-C port." Other error processing and policies may be implemented to handle this detected scenario.

Figure 12:
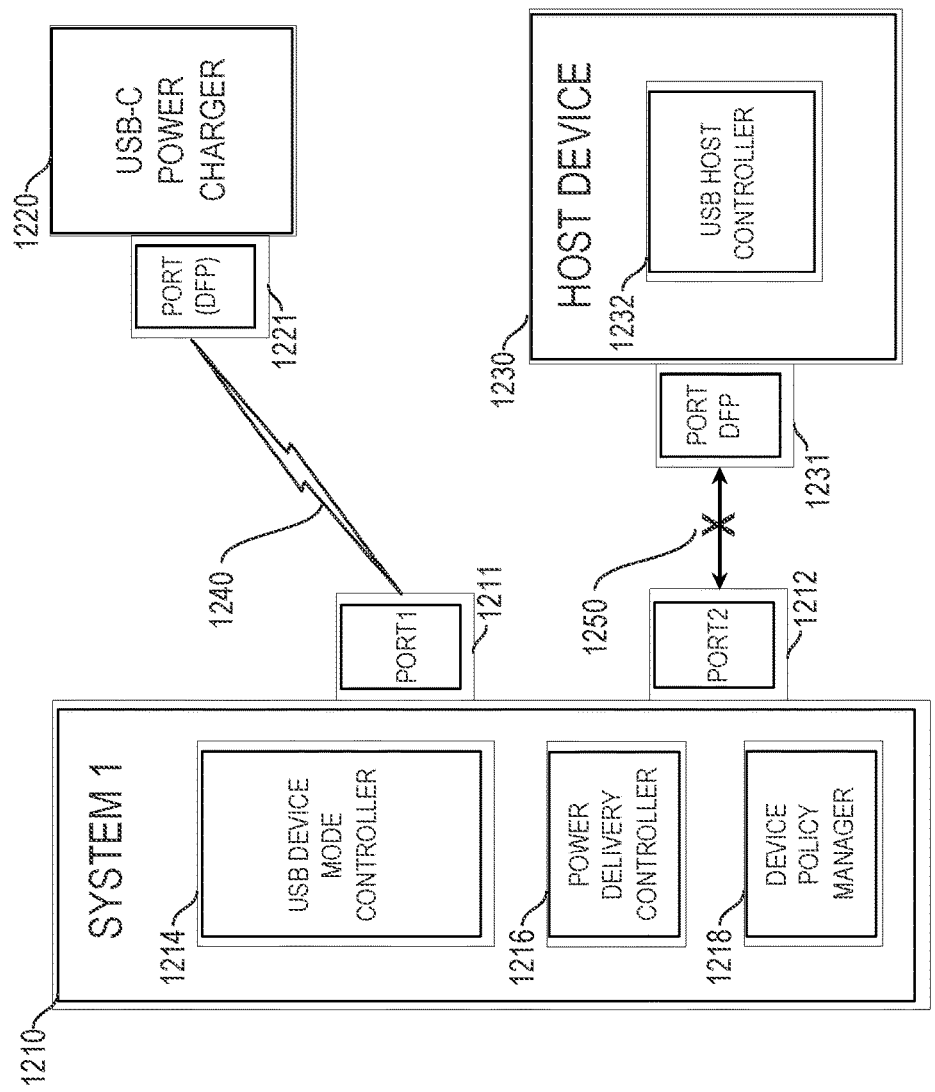
FIG. 12 illustrates a block diagram of a scenario involving the use of a USB-C power charger, power delivery controller, and device policy manager, in a computing system, for remapping of USB-C connectors, according to an example.

FIG. 12 illustrates an example scenario involving the use of a USB-C power charger 1220, power delivery controller 1216, and device policy manager 1218, in a computing system 1210, for remapping of USB-C connectors. Again, the configuration of the computing system 1210 includes multiple USB-C connectors 1211, 1212 with a single USB device mode controller 1214 shared across the connectors. Additionally, the power delivery controller 1216 is used in the computing system 1210 to manage the per-connector power capability of the USB-C connectors 1211, 1212. In a further example, the USB-C power charger 1220 (and one or more of the USB-C connectors) is provided through use of a docking station or like docking apparatus.

The USB-C connector may be used for charging, such as the charging connection 1240 established between the computing system 1210 and the USB-C power charger 1220. In existing scenarios, the default role of the connected USB-C connector 1211 on the computing system 1210 operates as an upstream facing port, because the USB-C power charger 1220 offers a port 1221 that would be recognized in the computing system 1210 by default as a downstream facing port. As a result, the power delivery controller 1216 controller allocates the USB device mode controller 1214 to that connector (port 1221). However, when another USB host, such as a host device 1230 is connected to another USB-C connector such as port 1212, then port 1212 will be unable to successfully establish USB communication with port 1231 controlled by a USB host controller 1232 (shown with connection failure 1250)—because the one device mode controller present on the computer system 1210 (USB device mode controller 1214) is already in use. To avoid this failure scenario, operation of the power delivery controller 1216 may be modified with the following techniques to coordinate reassignment of the USB device mode controller 1214.

In a first example, in cases where the charger does not use USB power delivery messaging, the power delivery controller 1216 will not be able to determine whether the charger is capable of USB communication. As a result, the power delivery controller 1216 and device policy manager 1218 alone cannot take any action without risk. Rather, the power delivery controller 1216 and the device policy manager 1218 may utilize information from the operating system to determine if the charger is capable of USB communication.

In a second example, for cases where the USB-C power charger 1220 uses USB power delivery messaging, the power delivery controller 1216 can determine if the power charger 1220 is capable of USB communication. If the power charger 1220 does not support USB communication, the power delivery controller 1216 can coordinate operations with the device policy manager 1218 to prevent or release controller assignment to the port being powered. For example, the device policy manager 1218 can operate to free up the USB device mode controller that was allocated to the USB-C connector to which the charger was connected. As a result, the USB device mode controller 1214 is made available for use on remaining connector(s) when another USB host (such as host device 1230) is connected to the remaining connector(s) in the future.

For example, the determination may include the following scenario. First, the device policy manager 1218 keeps track of which connector has ownership of the USB device mode controller 1214. Upon connection of any USB-C port partner, the power delivery controller 1216 obtains approval from device policy manager 1218 to allocate the USB device mode controller 1214 to that connector. The power delivery controller 1216 notifies the operating system about connection events, along with information if the USB device mode controller 1214 is allocated to that connector.

After some time period (such as after an X second timeout), the operating system checks if the USB device mode controller 1214 has successfully established communication with a port partner via the power connection. If the operating system determines that enumeration/communication is not happening, then it will notify the power delivery controller 1216; in response, the power delivery controller 1216 will notify the device policy manager 1218 to free up the USB device mode controller 1214 from the assignment to the USB-C connector. The device policy manager 1218 then marks the USB device mode controller 1214 as free within the system, allowing another USB-C connector to make use of the USB device mode controller 1214.

Figure 13:
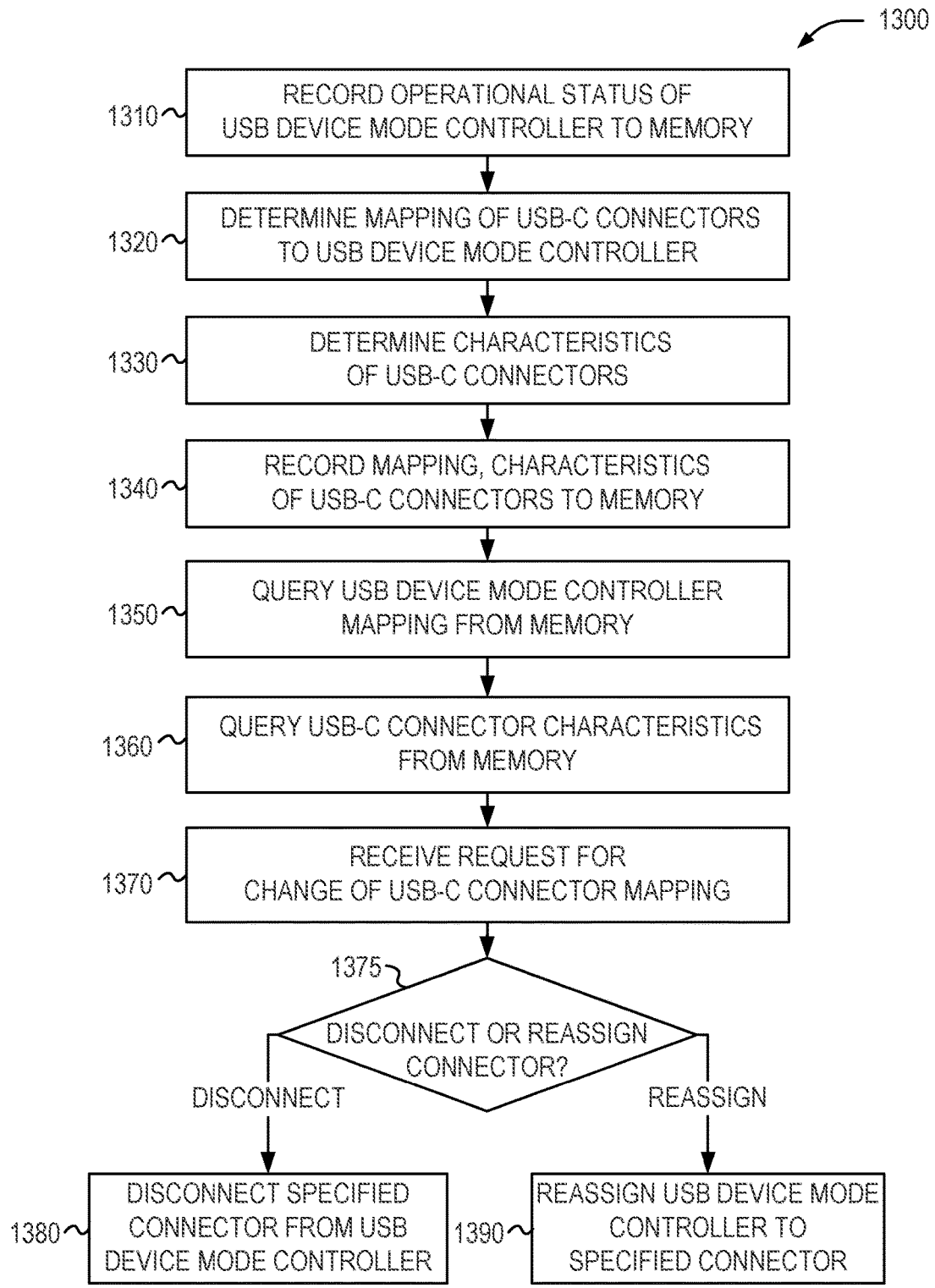
FIG. 13 illustrates a flowchart of a method performed by a computing system for modifying a mapping of a USB Device Mode controller for a USB-C connector, according to an example.

FIG. 13 illustrates a flowchart 1300 of an example method performed by a computing system for modifying a mapping of a USB device mode controller for a USB-C connector. In an example, the method of flowchart 1300 is executed by a computing system including a USB Device Mode controller, a plurality of USB-C connectors, system memory, and processing circuitry, with the processing circuitry configured (e.g., by executing instructions) to perform the respective operations. However, it will be understood that the following operations may be modified for the performance of additional or substitute processing activities, and additional hardware components and configurations.

As shown, the flowchart 1300 includes operations to record the operational status of the USB device mode controller to system memory (operation 1310). This operational status may be used to verify the existence (and availability) of the USB device mode controller in the computing system. Based on the availability of the USB device mode controller, operations may be performed to determine a mapping of a USB-C connector to the USB device mode controller (operation 1320), such as which particular connector of the plurality of connectors is assigned to the USB device mode controller; and to determine the characteristics of the connectors (operation 1330), such as the available communication capabilities for the respective USB-C connectors. This information may be recorded to system memory (operation 1340) for later retrieval and use.

At a subsequent time, such as in response to the attempt of a USB data connection over a USB-C connector, the information may be retrieved from the system memory. The retrieval of the information may include a query of the USB device mode controller mapping from the system memory (operation 1350) or a query of the USB-C connector characteristics from the system memory (operation 1360), or both. Further, this information may be retrieved in response to a request from an OPM driver of the operating system, such as in response to a detected system condition or a policy state.

In response to the mapping and connector characteristics, the operating system may initiate a change to the mapping of the USB device mode controller to a particular USB-C connector (operation 1370), which may be indicated in a request received from the OPM driver. (In another example, a device policy manager may also indicate a change to the mapping without operating system involvement, such as when a charger that capable of USB power delivery communication informs the device policy manager that it does not support USB communication.) This change to the mapping may indicate a disconnection or a reassignment of the particular USB-C connector (determination 1375), or in some examples, both disconnection and reassignment. Upon an indication to disconnect the particular USB-C connector, the connector is disconnected from control of the USB device mode controller (operation 1380). Upon an indication to reassign (e.g., swap) the connector, the USB device mode controller is switched from control of a first USB-C connector to a second USB-C connector (operation 1390).

Figure 14:
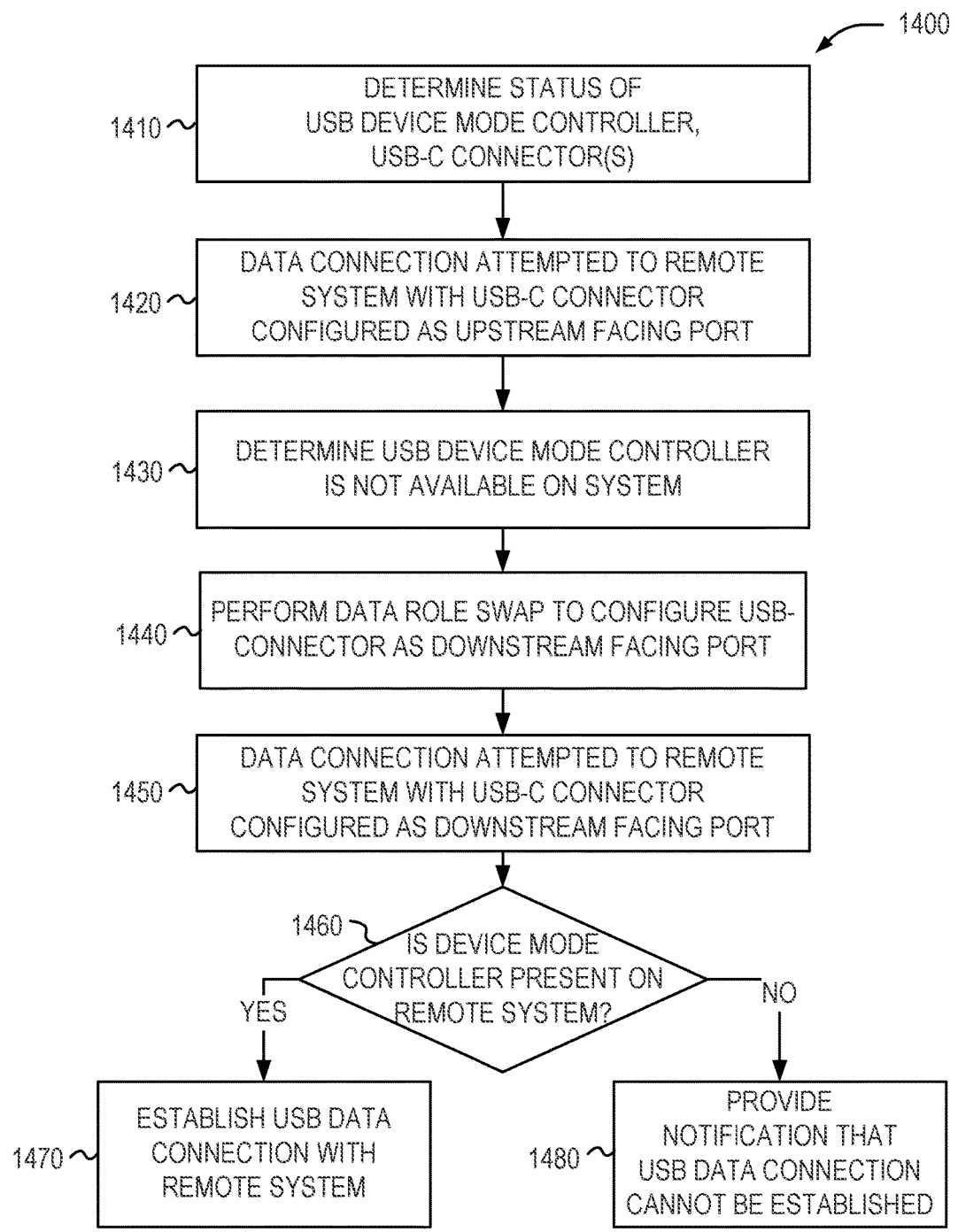
FIG. 14 illustrates a flowchart of a method performed by a computing system for handling a condition where a USB Device Mode controller is not available in the computing system, according to an example.

FIG. 14 illustrates a flowchart 1400 of an example method performed by a computing system for handling a condition where a USB Device Mode controller is not available in the computing system. In an example, the method of flowchart 1400 is executed by a system including a plurality of USB-C connectors, system memory, and processing circuitry), with the processing circuitry configured (e.g., by executing instructions) to perform the respective operations. However, it will be understood that the following operations may be modified for the performance of additional or substitute processing activities, and additional hardware components and configurations (including a computing system configuration that includes a USB device mode controller, but that is unable to disconnect or switch control to another USB-C connector).

As shown, the flowchart 1400 begins with operations to determine a status of the USB-C connectors in the computer system, and the availability of a USB device mode controller (if present in the computer system) (operation 1410). Later, an attempted USB data connection is provided from a remote computing system via a particular USB-C connector, but with the USB-C connector configured as an upstream facing port (operation 1420). In response, the availability of the USB device mode controller is evaluated, to determine that the USB device mode controller is not available for use with the particular USB-C connector (operation 1430).

In response to the unavailability of the USB device mode controller to operate the port in device mode, an attempt is made to reverse roles and operate the mode in host mode. This includes operations to perform a data role swap, and configure the particular USB-C connector as a downstream facing port (operation 1440), and attempt the data connection to the remote computing system with the particular USB-C connector now configured as a downstream facing port (operation 1450).

The operation of the data connection will be successful only if a USB device mode controller is available on the remote computing system (determination 1460). If a USB device mode controller is available on the remote system, then the computing system is able to proceed with establishing a USB data connection with the remote computing system (operation 1470). If a USB device mode controller is not available on the remote system, then the computing system may respond to this condition by canceling the data connection and providing other responses, such as providing a notification that the USB data connection cannot be established (operation 1480). Other notification messages, error handling, and policy changes may occur as a result of either condition.

Figure 15:
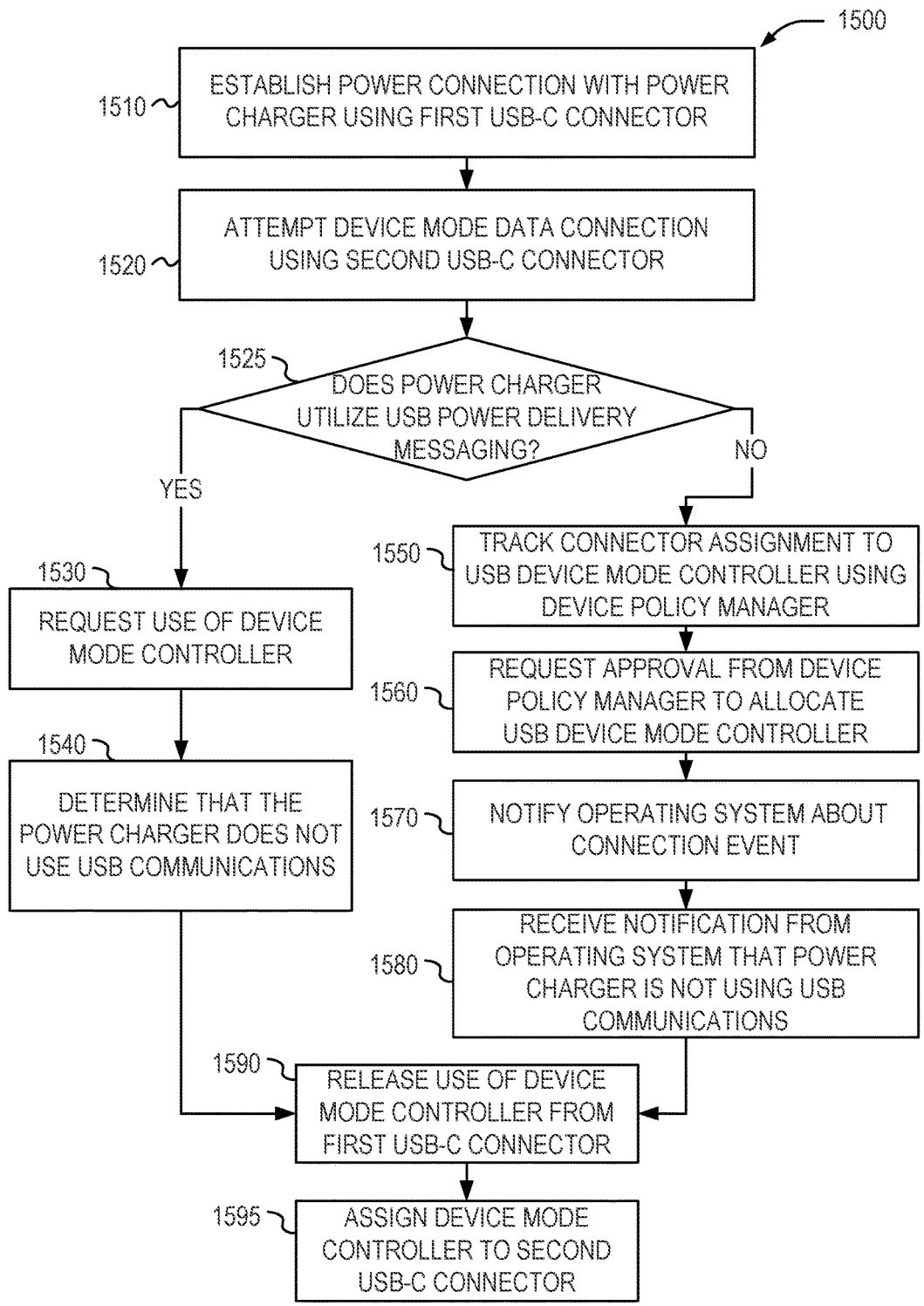
FIG. 15 illustrates a flowchart of a method performed by a computing system for managing per-connector capabilities of USB-C connectors used with power delivery, according to an example.

FIG. 15 illustrates a flowchart 1500 of an example method performed by a computing system for managing per-connector capabilities of USB-C ports used with power delivery. In an example, the method of flowchart 1500 is executed by a system including a plurality of USB-C connectors, system memory, and processing circuitry (including power delivery controller circuitry and a device policy manager), with the processing circuitry configured (e.g., by executing instructions) to perform the respective operations. However, it will be understood that the following operations may be modified for the performance of additional or substitute processing activities, and additional hardware components and configurations).

As shown, the flowchart 1500 begins with the use of a power connection that is established from a computing system to a power charger using a first USB-C connector (operation 1510). An attempt will be made with the computing system to attempt a device mode data connection using a second USB-C connector (operation 1520). However, the following technique is used in the case that the sole USB device mode controller in the computing system is already assigned to the first USB-C connector.

A determination is made whether the power charger supports the use of USB power delivery messaging (determination 1525). If the power charger supports this messaging, then a request may be made to the power device controller to request use of the device mode controller (operation 1530). In response, the power device controller can determine whether the power charger is using USB communications. If the power charger is determined to not use USB communications (operation 1540), then the USB device mode controller can be released from its assignment to the first USB-C connector. (If the power charger is determined to use USB communications, then an error message or indication can be output to the user, to indicate that the device mode is in use).

If the power charger does not support USB power delivery messaging, then operations may be performed with the device policy manager and the operating system to determine the status of a data connection over the first USB-C connector. This includes tracking the assignment of the USB device mode controller by the device policy manager (operation 1550). Approval is requested from the device policy manager to re-allocate the device mode controller to the second USB-C connector (operation 1560). The device policy manager then notifies the operating system about the connection event (operation 1570), and in response receives a notification from the operating system that the power charger is not using USB communications (operation 1580). (If the operating system determines that the power charger uses USB communications, then an error message or indication can be output to the user, to indicate that the device mode is in use). Further details on the operating system operations for this verification are detailed above in FIG. 12.

Finally, in response to determining that the device mode controller can be reassigned, the device mode controller can be released from the first USB-C connector (operation 1590) and assigned to the second USB-C connector (operation 1595). Other indications, policy actions, warning or error messages, and modifications to the operations above may be implemented with use of the operating system and the device policy manager. Additionally, the preceding techniques may be implemented with a power connection via a docking station or other multi-port apparatus.

Figure 16:
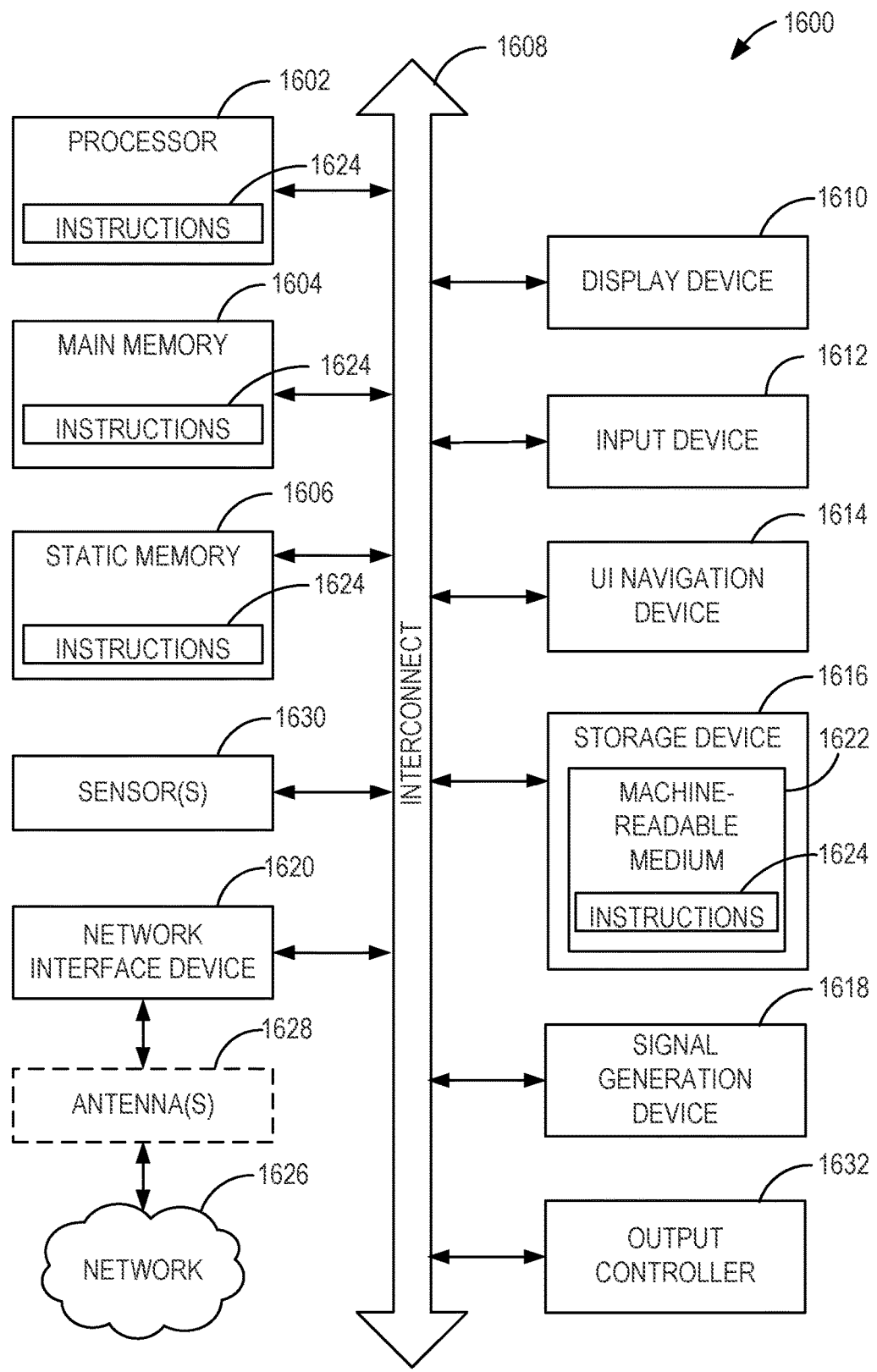
FIG. 16 illustrates a block diagram for an example computer system architecture upon which any one or more of the techniques (e.g., operations, processes, methods, and methodologies) discussed herein may be performed, according to an example.

FIG. 16 is a block diagram illustrating a machine in the example form of a computing system (e.g., computing device) 1600, within which a set or sequence of instructions may be executed to cause the machine to perform any one of the methodologies discussed herein, according to an example embodiment. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1600 includes at least one processor 1602 (e.g., a central processing unit (CPU), a graphics processing unit (GPU) or both, processor cores, compute nodes, etc.), a main memory 1604 and a static memory 1606, which communicate with each other via an interconnect 1608 (e.g., a link, a bus, etc.). The computer system 1600 may further include a video display unit 1610, an alphanumeric input device 1612 (e.g., a keyboard), and a user interface (UI) navigation device 1614 (e.g., a mouse). In one embodiment, the video display unit 1610, input device 1612 and UI navigation device 1614 are incorporated into a touch screen display. The computer system 1600 may additionally include a storage device 1616 (e.g., a drive unit), a signal generation device 1618 (e.g., a speaker), an output controller 1632, a network interface device 1620 (which may include or operably communicate with one or more antennas 1628, transceivers, or other wireless communications hardware), and one or more sensors 1630, such as a global positioning system (GPS) sensor, compass, accelerometer, location sensor, or other sensor.

The storage device 1616 includes a machine-readable medium 1622 on which is stored one or more sets of data structures and instructions 1624 (e.g., software) embodying or utilized by any one or more of the methodologies or functions described herein. The instructions 1624 may also reside, completely or at least partially, within the main memory 1604, static memory 1606, and/or within the processor 1602 during execution thereof by the computer system 1600, with the main memory 1604, static memory 1606, and the processor 1602 also constituting machine-readable media.

While the machine-readable medium 1622 is illustrated in an example embodiment to be a single medium, the term "machine-readable medium" may include a single medium or multiple media (e.g., a centralized or distributed database, and/or associated caches and servers) that store the one or more instructions 1624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1624 may further be transmitted or received over a communications network 1626 via an antenna 1628 using a transmission medium via the network interface device 1620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a computing system adapted for management of a USB device mode controller, the computing system comprising: a plurality of USB-C connectors; a USB device mode controller; and processing circuitry to: identify a mapping of the USB device mode controller and characteristics of the mapping of the USB device mode controller; receive a request for a change to the mapping of the USB device mode controller; and perform the change to the mapping of the USB device mode controller; wherein the mapping of the USB device mode controller indicates an assignment of the USB device mode controller to one of the plurality of USB-C connectors, and wherein the characteristics of the mapping indicate available communication capabilities for the one of the plurality of USB-C connectors.

In Example 2, the subject matter of Example 1 optionally includes system memory, with the processing circuitry further to: record an operational status of the USB device mode controller in the system memory; and retrieve, from the system memory, the operational status of the USB device mode controller; wherein operations to identify the mapping of the USB device mode controller and perform the change to the mapping of the USB device mode controller are performed in response to the operational status of the USB device mode controller stored in the system memory.

In Example 3, the subject matter of Example 2 optionally includes the processing circuitry further to: record the mapping of the USB device mode controller in the system memory; and record the characteristics of the mapping in the system memory; wherein operations to record the operational status of the USB device mode controller to the system memory operate to store data in a first memory location of the system memory; and wherein operations to record the mapping of the USB device mode controller and the characteristics of the mapping in the system memory operate to store data in a second memory location of the system memory.

In Example 4, the subject matter of any one or more of Examples 2-3 optionally include wherein operations to record the operational status of the USB device mode controller and operations to retrieve the operational status of the USB device mode controller are initiated by an operating system policy manager (OPM) driver.

In Example 5, the subject matter of any one or more of Examples 1-4 optionally include wherein the change in the mapping of the USB device mode controller includes operations to reassign the mapping of the USB device mode controller from a first USB-C connector to a second USB-C connector of the plurality of USB-C connectors.

In Example 6, the subject matter of Example 5 optionally includes wherein the mapping of the USB device mode controller is reassigned based on a user request received in an operating system of the computing system or based on a determination performed by a device policy manager of the computing system, and wherein the mapping of the USB device mode controller is changed from the first USB-C connector to the second USB-C connector.

In Example 7, the subject matter of any one or more of Examples 1-6 optionally include wherein the change in the mapping of the USB device mode controller includes operations to disconnect a first USB-C connector of the plurality of USB-C connectors from the USB device mode controller.

In Example 8, the subject matter of Example 7 optionally includes wherein the first USB-C connector is disconnected from the USB device mode controller based on a policy in an operating system of the computing system, the policy enacted by an operating system policy manager (OPM) driver.

In Example 9, the subject matter of any one or more of Examples 1-8 optionally include wherein operations to identify the mapping of the USB device mode controller and the characteristics of the mapping of the USB device mode controller are performed by Advanced Configuration and Power Interface (ACPI) methods.

In Example 10, the subject matter of Example 9 optionally includes wherein the operations to identify the mapping and the characteristics of the mapping are performed with: a device-specific method (_DSM) function of the ACPI methods, to request system firmware to write, to system memory, an indication of the mapping of the USB device mode controller and the characteristics of the mapping of the USB device mode controller; a physical device location (_PLD) function of the ACPI methods, to perform a query of the system memory to retrieve the mapping of the USB device mode controller; and a USB port capabilities (_UPC) function of the ACPI methods, to perform a query of the system memory to retrieve the mapping of the USB device mode controller.

In Example 11, the subject matter of any one or more of Examples 9-10 optionally include wherein objects for the ACPI methods that describe attributes of the plurality of USB-C connectors are implemented under scope of an operating system policy manager (OPM), to allow the USB device mode controller to be powered off and disconnected from the computing system.

Example 12 is at least one machine readable storage medium, comprising a plurality of instructions adapted for management of a USB device mode controller, wherein the instructions, responsive to being executed with processor circuitry of a computing system, cause the computing system to perform electronic operations that: identify a mapping of a USB device mode controller and characteristics of the mapping of the USB device mode controller; receive a request for a change to the mapping of the USB device mode controller; and perform the change to the mapping of the USB device mode controller; wherein the computing system includes the USB device mode controller, and wherein the computing system includes a plurality of USB-C connectors; and wherein the mapping of the USB device mode controller indicates an assignment of the USB device mode controller to one of the plurality of USB-C connectors, and wherein the characteristics of the mapping indicate available communication capabilities for the one of the plurality of USB-C connectors.

In Example 13, the subject matter of Example 12 optionally includes wherein the electronic operations further: record an operational status of the USB device mode controller in system memory of the computing system; and retrieve, from the system memory, the operational status of the USB device mode controller; wherein operations to identify the mapping of the USB device mode controller and perform the change in the mapping of the USB device mode controller are performed in response to the operational status of the USB device mode controller stored in the system memory.

In Example 14, the subject matter of Example 13 optionally includes wherein the electronic operations further: record the mapping of the USB device mode controller in the system memory; and record the characteristics of the mapping in the system memory; wherein operations to record the operational status of the USB device mode controller to the system memory operate to store data in a first memory location of the system memory; and wherein operations to record the mapping of the USB device mode controller and the characteristics of the mapping in the system memory operate to store data in a second memory location of the system memory.

In Example 15, the subject matter of any one or more of Examples 13-14 optionally include wherein the electronic operations to record the operational status of the USB device mode controller and the electronic operations to retrieve the operational status of the USB device mode controller are initiated by an operating system policy manager (OPM) driver executing in the computing system.

In Example 16, the subject matter of any one or more of Examples 12-15 optionally include wherein the change in the mapping of the USB device mode controller includes operations to reassign the mapping of the USB device mode controller from a first USB-C connector to a second USB-C connector of the plurality of USB-C connectors.

In Example 17, the subject matter of Example 16 optionally includes wherein the electronic operations further: reassign the mapping of the USB device mode controller based on a user request received in an operating system of the computing system or based on a determination performed by a device policy manager of the computing system, to change the mapping of the USB device mode controller from the first USB-C connector to the second USB-C connector.

In Example 18, the subject matter of any one or more of Examples 12-17 optionally include wherein the change in the mapping of the USB device mode controller includes operations to disconnect a first USB-C connector of the plurality of USB-C connectors from the USB device mode controller.

In Example 19, the subject matter of Example 18 optionally includes wherein the first USB-C connector is disconnected from the USB device mode controller based on a policy in an operating system of the computing system, the policy enacted by an operating system policy manager (OPM) driver.

In Example 20, the subject matter of any one or more of Examples 12-19 optionally include wherein the electronic operations to identify the mapping of the USB device mode controller and the characteristics of the mapping of the USB device mode controller are performed by Advanced Configuration and Power Interface (ACPI) methods.

In Example 21, the subject matter of Example 20 optionally includes wherein the electronic operations to identify the mapping and the characteristics of the mapping are performed with: a device-specific method (_DSM) function of the ACPI methods, to request system firmware to write, to system memory, an indication of the mapping of the USB device mode controller and the characteristics of the mapping of the USB device mode controller; a physical device location (_PLD) function of the ACPI methods, to perform a query of the system memory to retrieve the mapping of the USB device mode controller; and a USB port capabilities (_UPC) function of the ACPI methods, to perform a query of the system memory to retrieve the mapping of the USB device mode controller.

In Example 22, the subject matter of any one or more of Examples 20-21 optionally include wherein objects for the ACPI methods that describe attributes of the plurality of USB-C connectors are implemented under scope of an operating system policy manager (OPM), to allow the USB device mode controller to be powered off and disconnected from the computing system.

Example 23 is a computing system adapted for management of a USB device mode controller, comprising: a plurality of USB-C connectors, including a first USB-C connector and a second USB-C connector; and processing circuitry to: in response to an attempted data connection from a remote computing system via the first USB-C connector, determine availability of a USB device mode controller to control the first USB-C connector, wherein the attempted data connection occurs with the first USB-C connector configured as an upstream facing port; in response to a determination that a USB device mode controller is not available on the computing system to control the first USB-C connector, perform a data role swap of the first USB-C connector to configure the first USB-C connector as a downstream facing port; and continue the attempted data connection with the remote computing system via the first USB-C connector, with the first USB-C connector configured as a downstream facing port.

In Example 24, the subject matter of Example 23 optionally includes the processing circuitry further to: determine a status of the first USB-C connector, prior to the attempted data connection from the remote computing system.

In Example 25, the subject matter of any one or more of Examples 23-24 optionally include wherein the USB device mode controller is assigned to the second USB-C connector, prior to the attempted data connection from the remote computing system.

In Example 26, the subject matter of any one or more of Examples 23-25 optionally include the processing circuitry further to: determine whether a device mode controller is available on the remote computing system for facilitating the attempted data connection.

In Example 27, the subject matter of Example 26 optionally includes the processing circuitry further to: in response to a determination that the device mode controller is not available on the remote computing system, generate a notification that the attempted data connection cannot be established with the remote computing system.

In Example 28, the subject matter of any one or more of Examples 26-27 optionally include the processing circuitry further to: in response to a determination that the device mode controller is available on the remote computing system, establish the attempted data connection with the remote computing system.

In Example 29, the subject matter of any one or more of Examples 23-28 optionally include the processing circuitry further to: in response to a determination that the USB device mode controller is available on the computing system to control the first USB-C connector, assign the USB device mode controller to the first USB-C connector to configure the first USB-C connector as a downstream facing port.

Example 30 is at least one machine readable storage medium, comprising a plurality of instructions that, responsive to being executed with processor circuitry of a computing system including a USB device mode controller, a first USB-C connector, and a second USB-C connector, cause the computing system to manage the USB device mode controller with electronic operations that: in response to an attempted data connection from a remote computing system via the first USB-C connector, determine availability of the USB device mode controller to control the first USB-C connector, wherein the attempted data connection occurs with the first USB-C connector configured as an upstream facing port; in response to a determination that the USB device mode controller is not available on the computing system to control the first USB-C connector, perform a data role swap of the first USB-C connector to configure the first USB-C connector as a downstream facing port; and attempt performance of the attempted data connection with the remote computing system via the first USB-C connector, with the first USB-C connector configured as a downstream facing port.

In Example 31, the subject matter of Example 30 optionally includes wherein the electronic operations further: determine a status of the first USB-C connector, prior to the attempted data connection from the remote computing system.

In Example 32, the subject matter of any one or more of Examples 30-31 optionally include wherein the USB device mode controller is assigned to the second USB-C connector, prior to the attempted data connection from the remote computing system.

In Example 33, the subject matter of any one or more of Examples 30-32 optionally include wherein the electronic operations further: determine whether a device mode controller is available on the remote computing system for facilitating the attempted data connection.

In Example 34, the subject matter of Example 33 optionally includes wherein the electronic operations further: in response to a determination that the device mode controller is not available on the remote computing system, generate a notification that the attempted data connection cannot be established with the remote computing system.

In Example 35, the subject matter of any one or more of Examples 33-34 optionally include wherein the electronic operations further: in response to a determination that the device mode controller is available on the remote computing system, establish the attempted data connection with the remote computing system.

In Example 36, the subject matter of any one or more of Examples 30-35 optionally include wherein the electronic operations further: in response to a determination that the USB device mode controller is not available on the computing system to control the first USB-C connector, perform a data role swap of the first USB-C connector to configure the first USB-C connector as a downstream facing port.

Example 37 is a method for management of a USB device mode controller, comprising electronic operations executed in processing circuitry of a computing system, the computing system comprising a plurality of USB-C connectors and the USB device mode controller, wherein the electronic operations include: identifying a mapping of a USB device mode controller and characteristics of the mapping of the USB device mode controller; receiving a request for a change to the mapping of the USB device mode controller; and performing the change to the mapping of the USB device mode controller; wherein the mapping of the USB device mode controller indicates an assignment of the USB device mode controller to one of the plurality of USB-C connectors, and wherein the characteristics of the mapping indicate available communication capabilities for the one of the plurality of USB-C connectors.

In Example 38, the subject matter of Example 37 optionally includes wherein the electronic operations further include: recording an operational status of the USB device mode controller in system memory of the computing system; and retrieving, from the system memory, the operational status of the USB device mode controller; wherein identifying the mapping of the USB device mode controller and performing the change to the mapping of the USB device mode controller are performed in response to the operational status of the USB device mode controller stored in the system memory.

In Example 39, the subject matter of Example 38 optionally includes wherein the electronic operations further include: recording the mapping of the USB device mode controller in the system memory; and recording the characteristics of the mapping in the system memory; wherein recording the operational status of the USB device mode controller to the system memory operates to store data in a first memory location of the system memory; and wherein recording the mapping of the USB device mode controller and the characteristics of the mapping in the system memory operates to store data in a second memory location of the system memory.

In Example 40, the subject matter of any one or more of Examples 38-39 optionally include wherein operations of recording the operational status of the USB device mode controller and operations of retrieving the operational status of the USB device mode controller are initiated by an operating system policy manager (OPM) driver.

In Example 41, the subject matter of any one or more of Examples 37-40 optionally include wherein the change in the mapping of the USB device mode controller includes reassigning the mapping of the USB device mode controller from a first USB-C connector to a second USB-C connector of the plurality of USB-C connectors.

In Example 42, the subject matter of Example 41 optionally includes wherein the mapping of the USB device mode controller is reassigned based on a user request received in an operating system of the computing system or based on a determination performed by a device policy manager of the computing system, and wherein the mapping of the USB device mode controller is changed from the first USB-C connector to the second USB-C connector.

In Example 43, the subject matter of any one or more of Examples 37-42 optionally include wherein the change in the mapping of the USB device mode controller includes operations to disconnect a first USB-C connector of the plurality of USB-C connectors from the USB device mode controller.

In Example 44, the subject matter of Example 43 optionally includes wherein the first USB-C connector is disconnected from the USB device mode controller based on a policy in an operating system of the computing system, the policy enacted by an operating system policy manager (OPM) driver.

In Example 45, the subject matter of any one or more of Examples 37-44 optionally include wherein operations to identify the mapping of the USB device mode controller and the characteristics of the mapping of the USB device mode controller are performed by Advanced Configuration and Power Interface (ACPI) methods.

In Example 46, the subject matter of Example 45 optionally includes wherein the operations to identify the mapping and the characteristics of the mapping are performed with: a device-specific method (_DSM) function of the ACPI methods, to request system firmware to write, to system memory, an indication of the mapping of the USB device mode controller and the characteristics of the mapping of the USB device mode controller; a physical device location (_PLD) function of the ACPI methods, to perform a query of the system memory to retrieve the mapping of the USB device mode controller; and a USB port capabilities (_UPC) function of the ACPI methods, to perform a query of the system memory to retrieve the mapping of the USB device mode controller.

In Example 47, the subject matter of any one or more of Examples 45-46 optionally include wherein objects for the ACPI methods that describe attributes of the plurality of USB-C connectors are implemented under scope of an operating system policy manager (OPM), to allow the USB device mode controller to be powered off and disconnected from the computing system.

Example 48 is an apparatus comprising means for performing any of the methods of Examples 37-47.

Example 49 is at least one machine readable medium including instructions, which when executed by a computing system, cause the computing system to perform any of the methods of Examples 37-47.

Example 50 is an apparatus, comprising: means for identifying a mapping of a USB device mode controller and characteristics of the mapping of the USB device mode controller; means for receiving a request for a change to the mapping of the USB device mode controller; and means for performing the change to the mapping of the USB device mode controller; wherein the mapping of the USB device mode controller indicates an assignment of the USB device mode controller to one of a plurality of USB-C connectors, and wherein the characteristics of the mapping indicate available communication capabilities for the one of the plurality of USB-C connectors.

In Example 51, the subject matter of Example 50 optionally includes means for recording an operational status of the USB device mode controller; and means for retrieving the operational status of the USB device mode controller; wherein operations for mapping of the USB device mode controller and operations for changing the mapping of the USB device mode controller are performed in response to recording the operational status of the USB device mode controller.

In Example 52, the subject matter of Example 51 optionally includes means for recording the mapping of the USB device mode controller; and means for recording the characteristics of the mapping; wherein operations for recording the operational status of the USB device mode controller stores data in a first memory location; and wherein operations for recording the mapping of the USB device mode controller and the characteristics of the mapping stores data in a second memory location.

In Example 53, the subject matter of any one or more of Examples 51-52 optionally include means for initiating operations for recording the operational status of the USB device mode controller and operations for retrieving the operational status of the USB device mode controller.

In Example 54, the subject matter of any one or more of Examples 50-53 optionally include means for reassigning the mapping of the USB device mode controller from a first USB-C connector to a second USB-C connector of the plurality of USB-C connectors.

In Example 55, the subject matter of Example 54 optionally includes means for reassigning the mapping of the USB device mode controller based on a user request received in an operating system or based on a determination performed by a device policy manager; and means for changing the mapping of the USB device mode controller from the first USB-C connector to the second USB-C connector.

In Example 56, the subject matter of any one or more of Examples 50-55 optionally include means for disconnecting a first USB-C connector of the plurality of USB-C connectors from the USB device mode controller.

In Example 57, the subject matter of any one or more of Examples 50-56 optionally include means for disconnecting the first USB-C connector from the USB device mode controller based on a policy in an operating system, the policy enacted by an operating system policy manager (OPM) driver.

In Example 58, the subject matter of any one or more of Examples 50-57 optionally include means for identifying the mapping of the USB device mode controller and the characteristics of the mapping of the USB device mode controller using Advanced Configuration and Power Interface (ACPI) methods.

In Example 59, the subject matter of any one or more of Examples 50-58 optionally include means for requesting system firmware to write, to system memory, an indication of the mapping of the USB device mode controller and the characteristics of the mapping of the USB device mode controller; means for querying the system memory to retrieve the mapping of the USB device mode controller; and means for performing a query of the system memory to retrieve the mapping of the USB device mode controller.

In Example 60, the subject matter of any one or more of Examples 50-59 optionally include means for enabling the USB device mode controller to be powered off and disconnected.

Example 61 is a method for management of a USB device mode controller, comprising electronic operations executed in processing circuitry of a computing system, the computing system comprising a USB device mode controller, a first USB-C connector, and a second USB-C connector, wherein the electronic operations include: in response to an attempted data connection from a remote computing system via the first USB-C connector, determining availability of the USB device mode controller to control the first USB-C connector, wherein the attempted data connection occurs with the first USB-C connector configured as an upstream facing port; in response to determining that the USB device mode controller is not available on the computing system to control the first USB-C connector, performing a data role swap of the first USB-C connector to configure the first USB-C connector as a downstream facing port; and attempting performance of the attempted data connection with the remote computing system via the first USB-C connector, with the first USB-C connector configured as a downstream facing port.

In Example 62, the subject matter of Example 61 optionally includes the electronic operations further including: determining a status of the first USB-C connector, prior to the attempted data connection from the remote computing system.

In Example 63, the subject matter of any one or more of Examples 61-62 optionally include The method Example 61, wherein the USB device mode controller is assigned to the second USB-C connector, prior to the attempted data connection from the remote computing system.

In Example 64, the subject matter of any one or more of Examples 61-63 optionally include the electronic operations further including: determining whether a device mode controller is available on the remote computing system for facilitating the attempted data connection.

In Example 65, the subject matter of Example 64 optionally includes the electronic operations further including: in response to determining that the device mode controller is not available on the remote computing system, generating a notification that the attempted data connection cannot be established with the remote computing system.

In Example 66, the subject matter of any one or more of Examples 64-65 optionally include the electronic operations further including: in response to determining that the device mode controller is available on the remote computing system, establishing the attempted data connection with the remote computing system.

In Example 67, the subject matter of any one or more of Examples 61-66 optionally include the electronic operations further including: in response to determining that the USB device mode controller is not available on the computing system to control the first USB-C connector, performing a data role swap of the first USB-C connector to configure the first USB-C connector as a downstream facing port.

Example 68 is an apparatus comprising means for performing any of the methods of Examples 61-67.

Example 69 is at least one machine readable medium including instructions, which when executed by a computing system, cause the computing system to perform any of the methods of Examples 61-67.

Example 70 is an apparatus, comprising: means for determining availability of a USB device mode controller to control a first USB-C connector, in response to an attempted data connection from a remote computing system via the first USB-C connector, wherein the attempted data connection occurs with the first USB-C connector configured as an upstream facing port; means for performing a data role swap of the first USB-C connector to configure the first USB-C connector as a downstream facing port, in response to determining that the USB device mode controller is not available to control the first USB-C connector; and means for attempting performance of the attempted data connection with the remote computing system via the first USB-C connector, with the first USB-C connector configured as a downstream facing port.

In Example 71, the subject matter of Example 70 optionally includes means for determining a status of the first USB-C connector, prior to the attempted data connection from the remote computing system.

In Example 72, the subject matter of any one or more of Examples 70-71 optionally include means for assigning the USB device mode controller to a second USB-C connector, prior to the attempted data connection from the remote computing system.

In Example 73, the subject matter of any one or more of Examples 70-72 optionally include means for determining whether a device mode controller is available on the remote computing system for facilitating the attempted data connection.

In Example 74, the subject matter of Example 73 optionally includes means for generating a notification that the attempted data connection cannot be established with the remote computing system, in response to determining that the device mode controller is not available on the remote computing system.

In Example 75, the subject matter of any one or more of Examples 73-74 optionally include means for establishing the attempted data connection with the remote computing system, in response to determining that the USB device mode controller is available on the remote computing system.

In Example 76, the subject matter of any one or more of Examples 70-75 optionally include means for performing a data role swap of the first USB-C connector to configure the first USB-C connector as a downstream facing port, in response to determining that the USB device mode controller is not available to control the first USB-C connector.

Example 77 is a computing system adapted for management of a USB device mode controller, the computing system comprising: a plurality of USB-C connectors; a USB device mode controller; and processing circuitry to: establish a power connection with a power charger using a first USB-C connector of the plurality of USB-C connectors, wherein the USB device mode controller is assigned to the first USB-C connector; receive a request for a device mode data connection using a second USB-C connector of the plurality of USB-C connectors; and reassign the USB device mode controller from the first USB-C connector to the second USB-C connector.

In Example 78, the subject matter of Example 77 optionally includes the processing circuitry further to: release use of the USB device mode controller from the first USB-C connector in response to the request for the device mode data connection.

In Example 79, the subject matter of Example 78 optionally includes a power delivery controller, with the processing circuitry further to: determine, with the power delivery controller, that the power charger utilizes power delivery messaging; and request, with the power delivery controller, use of the USB device mode controller; wherein the power delivery controller operates to trigger the release of the USB device mode controller from the first USB-C connector in response to the request for the device mode data connection.

In Example 80, the subject matter of Example 79 optionally includes the processing circuitry further to: determine, with the power delivery controller, that device mode communications are not occurring with the power charger.

In Example 81, the subject matter of any one or more of Examples 79-80 optionally include the processing circuitry further to: determine, with the power delivery controller, that device mode communications are occurring with the power charger via the first USB-C connector; and prevent the USB device mode controller from releasing the first USB-C connector and to prevent reassignment of the USB device mode controller to the second USB-C connector until the device mode communications are complete.

In Example 82, the subject matter of any one or more of Examples 78-81 optionally include a power delivery controller, with the processing circuitry further to: determine, with the power delivery controller, that the power charger does not utilize USB power delivery messaging; wherein the power delivery controller operates to trigger the release of the USB device mode controller from the first USB-C connector in response to an indication from an operating system of the computing system that the power charger is not using USB data communications.

In Example 83, the subject matter of Example 82 optionally includes the processing circuitry further to: track assignment of connectors to the USB device mode controller using a device policy manager; and request approval from the device policy manager to allocate the USB device mode controller to the second USB-C connector.

In Example 84, the subject matter of Example 83 optionally includes the processing circuitry further to: notify an operating system of the computing system about a connection event, in response to the request for the device mode data connection; and receive the indication from the operating system that the power charger is not using USB data communications, in response to notification about the connection event.

Example 85 is at least one machine readable storage medium, comprising a plurality of instructions adapted for management of a USB device mode controller, wherein the instructions, responsive to being executed with processor circuitry of a computing system, cause the computing system to perform electronic operations that: establish a power connection with a power charger using a first USB-C connector of a plurality of USB-C connectors, wherein the USB device mode controller is assigned to the first USB-C connector; receive a request for a device mode data connection using a second USB-C connector of the plurality of USB-C connectors; and reassign the USB device mode controller from the first USB-C connector to the second USB-C connector.

In Example 86, the subject matter of Example 85 optionally includes wherein the electronic operations further: release use of the USB device mode controller from the first USB-C connector in response to the request for the device mode data connection.

In Example 87, the subject matter of Example 86 optionally includes wherein the computing system further includes a power delivery controller, and wherein the electronic operations further: determine, with the power delivery controller, that the power charger utilizes power delivery messaging; and request, with the power delivery controller, use of the USB device mode controller; wherein the power delivery controller operates to trigger the release of the USB device mode controller from the first USB-C connector in response to the request for the device mode data connection.

In Example 88, the subject matter of Example 87 optionally includes wherein the electronic operations further: determine, with the power delivery controller, that device mode communications are not occurring with the power charger.

In Example 89, the subject matter of any one or more of Examples 87-88 optionally include wherein the electronic operations further: determine, with the power delivery controller, that device mode communications are occurring with the power charger via the first USB-C connector; and prevent the USB device mode controller from releasing the first USB-C connector and to prevent reassignment of the USB device mode controller to the second USB-C connector until the device mode communications are complete.

In Example 90, the subject matter of any one or more of Examples 85-89 optionally include wherein the computing system further includes a power delivery controller, and wherein the electronic operations further: determine, with the power delivery controller, that the power charger does not utilize USB power delivery messaging; wherein the power delivery controller operates to trigger a release of the USB device mode controller from the first USB-C connector in response to an indication from an operating system of the computing system that the power charger is not using USB data communications.

In Example 91, the subject matter of Example 90 optionally includes wherein the electronic operations further: track assignment of connectors to the USB device mode controller using a device policy manager; and request approval from the device policy manager to allocate the USB device mode controller to the second USB-C connector.

In Example 92, the subject matter of Example 91 optionally includes wherein the electronic operations further: notify an operating system of the computing system about a connection event, in response to the request for the device mode data connection; and receive the indication from the operating system that the power charger is not using USB data communications, in response to notification about the connection event.

Example 93 is a method for management of a USB device mode controller, comprising electronic operations executed in processing circuitry of a computing system, the computing system comprising a plurality of USB-C connectors and the USB device mode controller, wherein the electronic operations include: establishing a power connection with a power charger using a first USB-C connector of the plurality of USB-C connectors, wherein the USB device mode controller is assigned to the first USB-C connector; receiving a request for a device mode data connection using a second USB-C connector of the plurality of USB-C connectors; and reassigning the USB device mode controller from the first USB-C connector to the second USB-C connector.

In Example 94, the subject matter of Example 93 optionally includes wherein the electronic operations further include: releasing use of the USB device mode controller from the first USB-C connector in response to the request for the device mode data connection.

In Example 95, the subject matter of Example 94 optionally includes wherein the electronic operations further include: determining, with a power delivery controller, that the power charger utilizes power delivery messaging; and requesting, with the power delivery controller, use of the USB device mode controller; wherein the power delivery controller operates to trigger the release of the USB device mode controller from the first USB-C connector in response to the request for the device mode data connection.

In Example 96, the subject matter of Example 95 optionally includes wherein the electronic operations further include: determining, with the power delivery controller, that device mode communications are not occurring with the power charger.

In Example 97, the subject matter of any one or more of Examples 95-96 optionally include wherein the electronic operations further include: determining, with the power delivery controller, that device mode communications are occurring with the power charger via the first USB-C connector; and preventing the USB device mode controller from releasing the first USB-C connector and preventing the reassignment of the USB device mode controller to the second USB-C connector until the device mode communications are complete.

In Example 98, the subject matter of any one or more of Examples 93-97 optionally include wherein the electronic operations further include: determining, with a power delivery controller, that the power charger does not utilize USB power delivery messaging; wherein the power delivery controller operates to trigger a release of the USB device mode controller from the first USB-C connector in response to an indication from an operating system of the computing system that the power charger is not using USB data communications.

In Example 99, the subject matter of Example 98 optionally includes wherein the electronic operations further include: tracking assignment of connectors to the USB device mode controller using a device policy manager; and requesting approval from the device policy manager to allocate the USB device mode controller to the second USB-C connector.

In Example 100, the subject matter of Example 99 optionally includes wherein the electronic operations further include: notifying an operating system of the computing system about a connection event, in response to the request for the device mode data connection; and receive the indication from the operating system that the power charger is not using USB data communications, in response to notification about the connection event.

Example 101 is an apparatus comprising means for performing any of the methods of Examples 93-100.

Example 102 is at least one machine readable medium including instructions, which when executed by a computing system, cause the computing system to perform any of the methods of Examples 93-100.

Example 103 is an apparatus, comprising: means for establishing a power connection with a power charger using a first USB-C connector of a plurality of USB-C connectors, wherein a USB device mode controller is assigned to the first USB-C connector; receiving a request for a device mode data connection using a second USB-C connector of the plurality of USB-C connectors; and reassigning the USB device mode controller from the first USB-C connector to the second USB-C connector.

In Example 104, the subject matter of Example 103 optionally includes means for releasing use of the USB device mode controller from the first USB-C connector in response to the request for the device mode data connection.

In Example 105, the subject matter of Example 104 optionally includes means for determining that the power charger utilizes power delivery messaging; and means for requesting use of the USB device mode controller.

In Example 106, the subject matter of Example 105 optionally includes means for determining that device mode communications are not occurring with the power charger.

In Example 107, the subject matter of any one or more of Examples 105-106 optionally include means for determining that device mode communications are occurring with the power charger via the first USB-C connector; and means for preventing the USB device mode controller from releasing the first USB-C connector and preventing the reassignment of the USB device mode controller to the second USB-C connector until the device mode communications are complete.

In Example 108, the subject matter of any one or more of Examples 103-107 optionally include means for determining that the power charger does not utilize USB power delivery messaging; and means for triggering a release of the USB device mode controller from the first USB-C connector in response to an indication that the power charger is not using USB data communications.

In Example 109, the subject matter of Example 108 optionally includes means for tracking assignment of connectors to the USB device mode controller; and means for requesting approval to allocate the USB device mode controller to the second USB-C connector.

In Example 110, the subject matter of Example 109 optionally includes means for notifying the computing system about a connection event, in response to the request for the device mode data connection; and means for receiving the indication that the power charger is not using USB data communications, in response to notification about the connection event.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing system adapted for management of a USB device mode controller, the computing system comprising:
   a plurality of USB-C connectors, including a first USB-C connector and a second USB-C connector; and
   processing circuitry to:
   in response to an attempted data connection from a remote computing system via the first USB-C connector, determine availability of a USB device mode controller to manage the first USB-C connector, wherein the attempted data connection occurs with the first USB-C connector configured as an upstream facing port, wherein the USB device mode controller is configured to manage one USB-C connector at a time:
   in response to a determination that the USB device mode controller is not available to provide management of the first USB-C connector on the computing system, perform a data role swap of the first USB-C connector to configure the first USB-C connector as a downstream facing port to enable operation in device mode; and
   continue the attempted data connection with the remote computing system via the first USB-C connector, with the first USB-C connector configured as a downstream facing port.

2. The computing system of claim 1, the processing circuitry further to:
   determine a status of the first USB-C connector, prior to the attempted data connection from the remote computing system.

3. The computing system of claim 1, wherein the USB device mode controller is assigned to the second USB-C connector, prior to the attempted data connection from the remote computing system.

4. The computing system of claim 1, the processing circuitry further to:
   determine whether a device mode controller is available on the remote computing system for facilitating the attempted data connection.

5. The computing system of claim 4, the processing circuitry further to:
   in response to a determination that the device mode controller is not available on the remote computing system, generate a notification that the attempted data connection cannot be established with the remote computing system.

6. The computing system of claim 4, the processing circuitry further to:
   in response to a determination that the device mode controller is available on the remote computing system, establish the attempted data connection with the remote computing system.

7. The computing system of claim 1, the processing circuitry further to:
   in response to a determination that the USB device mode controller is available on the computing system to manage the first USB-C connector, assign the USB device mode controller to the first USB-C connector to configure the first USB-C connector as a downstream facing port.

8. At least one machine readable storage medium, comprising a plurality of instructions that, responsive to being executed with processor circuitry of a computing system including a USB device mode controller, a first USB-C connector, and a second USB-C connector, cause the computing system to manage the USB device mode controller with electronic operations that:
   in response to an attempted data connection from a remote computing system via the first USB-C connector, determine availability of the USB device mode controller to manage the first USB-C connector, wherein the attempted data connection occurs with the first USB-C connector configured as an upstream facing port, and wherein the USB device mode controller is configured to manage one USB-C connector at a time;
   in response to a determination that the USB device mode controller is not available to provide management of the first USB-C connector on the computing system, perform a data role swap of the first USB-C connector to configure the first USB-C connector as a downstream facing port to enable operation in device mode; and
   attempt performance of the attempted data connection with the remote computing system via the first USB-C connector, with the first USB-C connector configured as a downstream facing port.

9. The machine readable storage medium of claim 8, wherein the electronic operations further: determine a status of the first USB-C connector, prior to the attempted data connection from the remote computing system.

10. The machine readable storage medium of claim 8, wherein the USB device mode controller is assigned to the second USB-C connector, prior to the attempted data connection from the remote computing system.

11. The machine readable storage medium of claim 8, wherein the electronic operations further:
   determine whether a device mode controller is available on the remote computing system fo facilitating the attempted data connection.

12. The machine readable storage medium of claim 11, wherein the electronic operations further:
   in response to a determination that the device mode controller is not available on the remote computing system, generate a notification that the attempted data connection cannot be established with the remote computing system.

13. The machine readable storage medium of claim 11, wherein the electronic operations further:
   in response to a determination that the device mode controller is available on the remote computing system, establish the attempted data connection with the remote computing system.

14. The machine readable storage medium of claim 8, wherein the electronic operations further:
   in response to a determination that the USB device mode controller is available on the computing system to manage the first USB-C connector, assign the USB device mode controller to the first USB-C connector to configure the first USB-C connector as a downstream facing port.

15. A method for management of a USB device mode controller, comprising electronic operations executed in processing circuitry of a computing system, the computing system comprising a USB device mode controller, a first USB-C connector, and a second USB-C connector, wherein the electronic operations include:
   in response to an attempted data connection from a remote computing system via the first USB-C connector, determining availability of the USB device mode controller to manage the first USB-C connector, wherein the attempted data connection occurs with the first USB-C connector configured as an upstream facing port, and wherein the USB device mode controller is configured to manage one USB-C connector at a time:
   in response to determining that the USB device mode controller is not available to provide management of the first USB-C connector on the computing system, performing a data role swap of the first USB-C connector to configure the first USB-C connector as a downstream facing port to enable operation in device mode; and
   attempting performance of the attempted data connection with the remote computing system via the first USB-C connector, with the first USB-C connector configured as a downstream facing port.

16. The method of claim 15, wherein the electronic operations further include:
   determining a status of the first USB-C connector, prior to the attempted data connection from the remote computing system.

17. The method of claim 15, wherein the USB device mode controller is assigned to the second USB-C connector, prior to the attempted data connection from the remote computing system.

18. The method of claim 15, wherein the electronic operations further include:
   determining whether a device mode controller available on the remote computing system for facilitating the attempted data connection.

19. The method of claim 18, wherein the electronic operations further include:
   in response to determining that the device mode controller is not available on the remote computing system, generating a notification that the attempted data connection cannot be established with the remote computing system.

20. The method of claim 18, wherein the electronic operations further include:
   in response to determining that the device mode controller is available on the remote computing system, establishing the attempted data connection with the remote computing system.

21. The method of claim 15, wherein the electronic operations further include:
   in response to determining that the USB device mode controller is available on the computing system to manage the first USB-C connector, assign the USB device mode controller to the first USB-C connector to configure the first USB-C connector as a downstream facing port.

* * * * *

UNITED STATES PATENT AND TRADEMARK OFFICE
CERTIFICATE OF CORRECTION

| | | |
|---|---|---|
| PATENT NO. | : 10,521,386 B2 | Page 1 of 1 |
| APPLICATION NO. | : 16/109994 | |
| DATED | : December 31, 2019 | |
| INVENTOR(S) | : Kadgi et al. | |

It is certified that error appears in the above-identified patent and that said Letters Patent is hereby corrected as shown below:

On the Title Page

On page 2, in Column 2, in item (57), in "Abstract", in Column 1, Line 1, delete "may," and insert --may-- therefor In the Claims In Column 29, Line 55, in Claim 1, delete "time:" and insert --time;-- therefor In Column 31, Line 4, in Claim 11, delete "fo" and insert --for-- therefor In Column 31, Line 40, in Claim 15, delete "time:" and insert --time;-- therefor In Column 32, Line 19, in Claim 18, after "controller", insert --is--

Signed and Sealed this
Third Day of September, 2024

Katherine Kelly Vidal
*Director of the United States Patent and Trademark Office*